(12) United States Patent
Hwang et al.

(10) Patent No.: US 10,144,836 B2
(45) Date of Patent: Dec. 4, 2018

(54) CARBON NANOTUBE DISPERSION LIQUID COMPOSITION AND METHOD FOR MANUFACTURING OF THE SAME, CONDUCTIVE COATING LIQUID COMPOSITION COMPRISING THE SAMEN, ANTISTATIC FILM AND DISPLAY DEVICE USING THE SAME

(71) Applicants: LG DISPLAY CO., LTD., Seoul (KR); NANO Solution CO., LTD., Jeonju-si, Jeollabuk-do (KR)

(72) Inventors: Junsik Hwang, Seoul (KR); Kwihong Park, Paju-si (KR); Yuseon Kho, Seoul (KR); Hyungyul Kim, Seongnam-si (KR); Hojun Moon, Jeonju-si (KR)

(73) Assignees: LG DISPLAY CO., LTD., Seoul (KR); NANO SOLUTION CO., LTD., Jeonju (KR)

( * ) Notice: Subject to any disclaimer, the term of this patent is extended or adjusted under 35 U.S.C. 154(b) by 0 days.

(21) Appl. No.: 15/626,564

(22) Filed: Jun. 19, 2017

(65) Prior Publication Data
US 2017/0283625 A1    Oct. 5, 2017

Related U.S. Application Data

(62) Division of application No. 14/954,431, filed on Nov. 30, 2015, now Pat. No. 9,714,350.

(30) Foreign Application Priority Data

Dec. 1, 2014 (KR) .......................... 10-2014-0169602
Oct. 27, 2015 (KR) .......................... 10-2015-0149779

(51) Int. Cl.
C09D 5/24 (2006.01)
G02F 1/1333 (2006.01)
C09D 7/40 (2018.01)
B82Y 99/00 (2011.01)
C08K 3/04 (2006.01)

(52) U.S. Cl.
CPC ................. *C09D 5/24* (2013.01); *C09D 7/70* (2018.01); *G02F 1/133308* (2013.01); *B82Y 99/00* (2013.01); *C08K 3/04* (2013.01); *C08K 3/041* (2017.05); *G02F 1/13338* (2013.01); *G02F 2001/133334* (2013.01); *G02F 2202/22* (2013.01); *G02F 2202/36* (2013.01); *Y10S 977/742* (2013.01)

(58) Field of Classification Search
CPC .............................. C09D 5/24; G02F 1/13338
USPC ........................................................ 524/379
See application file for complete search history.

(56) References Cited

U.S. PATENT DOCUMENTS

2014/0151596 A1*  6/2014  Hirsch ................ C09D 7/1216
                                                              252/75

FOREIGN PATENT DOCUMENTS

KR    10-2013-0082300 A    7/2013
KR    20130082300       *  7/2013

OTHER PUBLICATIONS

Translation of KR20130082300, Jul. 2013.*

* cited by examiner

*Primary Examiner* — Hui H Chin
(74) *Attorney, Agent, or Firm* — Dentons US LLP

(57) ABSTRACT

Disclosed is a carbon nanotube dispersion liquid composition for forming a conductive layer in a display device. The carbon nanotube dispersion liquid composition includes, for example, 0.05 to 20 wt % of carbon nanotubes, 0.02 to 40 wt % of a polyacrylic acid resin, and 50 to 99.93 wt % of $C_2$-$C_5$ straight-chain alkanol, based on the total weight of the carbon nanotube dispersion liquid composition.

8 Claims, 10 Drawing Sheets

CARBON NANOTUBE DISPERSION LIQUID COMPOSITION AND METHOD FOR MANUFACTURING OF THE SAME, CONDUCTIVE COATING LIQUID COMPOSITION COMPRISING THE SAMEN, ANTISTATIC FILM AND DISPLAY DEVICE USING THE SAME

This application is a Divisional of application Ser. No. 14/954,431 filed Nov. 30, 2015, which claims priority to Korean Patent Application No. 10-2014-0169602, filed on Dec. 1, 2014, and Korean Patent Application No. 10-2015-0149779, filed on Oct. 27, 2015, respectively, all of which are hereby incorporated by reference for all purposes as if fully set forth herein.

BACKGROUND OF THE INVENTION

Field of the Invention

The present invention relates to a carbon nanotube dispersion liquid composition, a method for manufacturing the same and a display device using the same. More particularly, the present invention relates to an antistatic film and a display device using the same.

Discussion of the Related Art

With the current rapid development to the information-oriented society, there is a growing need of flat panel displays having excellent characteristics, such as slim profile, lightweight, and low power consumption. Of these, liquid crystal displays have been widely applied to laptops or desktop monitors due to their excellent resolution, color display, and picture quality.

In general, a liquid crystal display is a device in which two substrates each having electrodes on one surface thereof are disposed such that the electrode-formed surfaces face each other, a liquid crystal material is interposed between the two substrates, and then a voltage is applied to the electrodes formed on the respective substrates to generate an electric field, which moves liquid crystal molecules to vary the transmittance of light, thereby displaying images. Here, static electricity may be generated during the unit processes of manufacturing each substrate of the liquid crystal display.

In order to discharge such static electricity and effectively release charges accumulated at the time of producing finished products, indium-tin-oxide (ITO) or indium-zinc-oxide (IZO), which is a transparent conductive material, is utilized for an antistatic film on an external surface of the upper substrate. However, indium-tin-oxide (ITO) or indium-zinc-oxide (IZO) is an expensive material, which thus increases the manufacturing costs. Particularly, indium, which is a main material of indium-tin-oxide (ITO) or indium-zinc-oxide (IZO), is a rare metal and its price rapidly increases these days, and its supply is currently restricted due to the export control policy of the resource holding countries.

Recently, portable displays such as mobile phones, PDAs and laptops are on the market, which can be operated by a screen touch due to embedded touch sensors, are attracting much attention from users. Following this trend, various attempts have been recently made to provide a touch function in liquid crystal displays that are used as a display device for various products. Of these, in-cell type liquid crystal displays having a touch function embedded therein are increasingly demanded. In-cell touch type liquid crystal displays have advantages, such as slim profile, low manufacturing costs, and lightweight, since touch electrodes are formed inside the display panel without attaching a separate touch panel on the liquid crystal display.

However, even when a touch sensor is provided inside the display panel, an antistatic film is provided to perform discharging static electricity, and thus a capacitance change generated by a user's touch through a finger or the like may not be accurately sensed, thereby resulting in deterioration in the touch sensitivity of the touch sensor. In other words, the antistatic film serves as a conductor with relatively high electrical conductivity when compared with an amount of capacitance generated by a finger touch or the like, thereby discharging the capacitance so that the touch sensor may not accurately sense the touch position of the user.

When an antistatic film is not used for such a display device integrated with a touch sensor to address the aforementioned problem, the failure rate may increase due to the static electricity generated during the manufacturing processes, thus increasing manufacturing costs and degrading display quality.

SUMMARY OF THE INVENTION

Accordingly, the present invention is directed to a carbon nanotube dispersion liquid composition, a display device including a conductive layer formed of the same, and a method of manufacturing the same that substantially obviate one or more problems due to limitations and disadvantages of the related art.

An advantage of the present invention is to provide a display device having a conductive layer that includes carbon nanotubes.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a carbon nanotube dispersion liquid composition may, for example, include 0.05 to 20 wt % of carbon nanotubes, 0.02 to 40 wt % of a polyacrylic acid resin, and 50 to 99.93 wt % of $C_2$-$C_5$ straight-chain alkanol, based on a total weight of the carbon nanotube dispersion liquid composition.

The polyacrylic acid resin has a weight average molecular weight of 2,000 to 3,000,000.

The polyacrylic acid resin has a weight average molecular weight of 8,000 to 12,000.

The alkanol is at least one of ethanol, n-propanol, n-butanol, and n-pentanol.

The carbon nanotube dispersion liquid composition further comprising an acrylic block copolymer dispersant.

The acrylic block copolymer dispersant is substituted with at least one of an amine group and a carboxyl group.

The acrylic block copolymer dispersant is contained in 0.1 to 2 wt % based on the total weight of the carbon nanotube dispersion liquid composition.

In another aspect, a method for manufacturing a carbon nanotube dispersion liquid composition, by mixing 0.05 to 20 wt % of carbon nanotubes, 0.02 to 40 wt % of a polyacrylic acid resin, and 50 to 99.93 wt % of $C_2$-$C_5$ straight-chain alkanol, based on a total weight of the carbon nanotube dispersion liquid composition, followed by high-pressure dispersion at a pressure of 1000 to 1800 bar.

The diameter of a nozzle, through which the composition is jetted at the time of high-pressure dispersion, is 50 μm to 400 μm.

In another aspect, a method for manufacturing a display device may, for example, include forming a conductive layer in the display device based on a carbon nanotube dispersion liquid composition comprising 10 to 100 parts by weight of a silane sol based on 100 parts by weight of a carbon nanotube dispersion liquid composition, the carbon nanotube dispersion liquid composition comprising 0.05 to 20 wt % of carbon nanotubes, 0.02 to 40 wt % of a polyacrylic acid resin, and 50 to 99.93 wt % of $C_2$-$C_5$ straight-chain alkanol, based on a total weight of the carbon nanotube dispersion liquid composition.

The silane sol includes an alkoxy silane compound, an acidic catalyst, an alcohol-based solvent, and water.

The conductive coating liquid composition comprises 20 to 60 wt % of an alkoxy silane compound, 0.01 to 10 wt % of an acidic catalyst, 10 to 70 wt % of an alcohol-based solvent, and 5 to 60 wt % of water, based on the total weight of the silane sol.

The pH of the carbon nanotube dispersion liquid composition is 1.7 to 3.5, and the difference between the pH of the silane sol and the pH of the carbon nanotube dispersion liquid composition is within 0.3.

In another aspect, an antistatic film formed of the conductive coating liquid composition, the conductive coating liquid composition comprising 10 to 100 parts by weight of a silane sol based on 100 parts by weight of a carbon nanotube dispersion liquid composition, the carbon nanotube dispersion liquid composition comprising 0.05 to 20 wt % of carbon nanotubes, 0.02 to 40 wt % of a polyacrylic acid resin, and 50 to 99.93 wt % of C2-C5 straight-chain alkanol, based on a total weight of the carbon nanotube dispersion liquid composition.

In another aspect, a display device comprising an antistatic film formed of the conductive coating liquid composition, the conductive coating liquid composition comprising 10 to 100 parts by weight of a silane sol based on 100 parts by weight of a carbon nanotube dispersion liquid composition, the carbon nanotube dispersion liquid composition comprising 0.05 to 20 wt % of carbon nanotubes, 0.02 to 40 wt % of a polyacrylic acid resin, and 50 to 99.93 wt % of C2-C5 straight-chain alkanol, based on a total weight of the carbon nanotube dispersion liquid composition.

In another aspect, a display device may, for example, include a display panel having upper and lower substrates; an antistatic film on the upper substrate, wherein the antistatic film comprises a matrix material and carbon nanotubes dispersed in the matrix material, the antistatic film having a sheet resistance value of $10^7 \Omega/\square$ to $10^9 \Omega/\square$.

The display panel has touch electrodes embedded therein.

The sheet resistance value of the carbon nanotubes is $1000\Omega/\square$ to $20000\Omega/\square$.

In another aspect, an antistatic film, comprising a matrix material and carbon nanotubes dispersed in the matrix material and having a sheet resistance value of $10^7 \Omega/\square$ to $10^9 \Omega/\square$.

The sheet resistance value of the carbon nanotubes is $1000\Omega/\square$ to $20000 \Omega/\square$.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
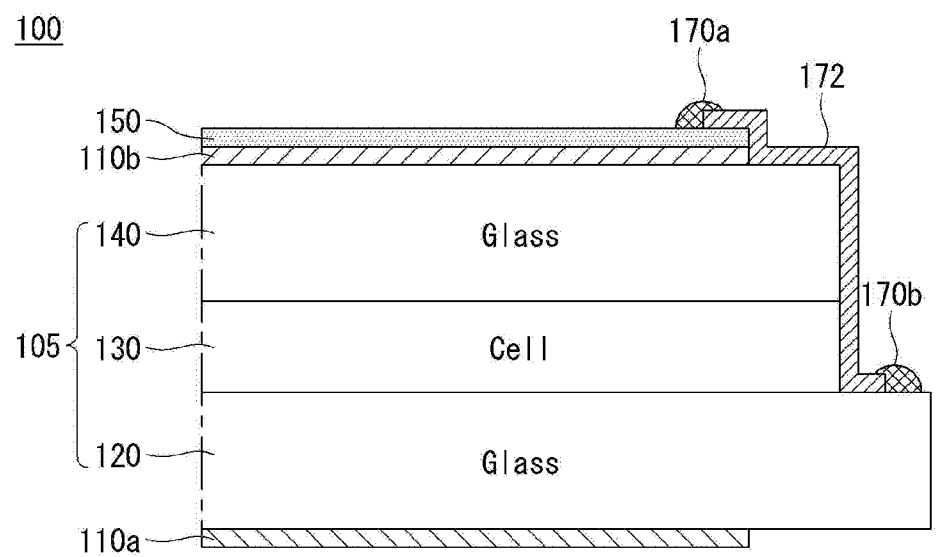
FIG. 1 is a cross-sectional view of a general display device.

FIG. 1 is a cross-sectional view of a general display device.

Referring to FIG. 1, a display device 100 includes a lower substrate 120, an upper substrate 140 facing the lower substrate 120, and an antistatic film 150 disposed on the upper substrate 140. A lower polarizer 110a is disposed on an external surface (in a lower direction on the drawing) of the lower substrate 120, and a cell 130 is disposed between the lower substrate 120 and the upper substrate 140, wherein touch electrodes (TE) are disposed inside the cell 130. Meanwhile, an upper polarizer 110b is disposed on the upper substrate 140, and the antistatic film 150 is disposed on the upper polarizer 110b.

The display device 100 is an in-cell type display device in which the touch electrodes (TE) are disposed inside the cell 130. However, this is merely an example for convenience of explanation, and the present invention is not limited thereto. For example, the cell 130 may be a liquid crystal layer, and the display device 100 may be a liquid crystal display.

Meanwhile, the antistatic film 150 may be formed of indium-tin-oxide (ITO) or indium-zinc-oxide (IZO), which is a transparent conductive material, or may be formed of a conductive polymer, for example, polyethylenedioxythiphene:polystyrene sulfonic acid (PEDOT:PSS). However, indium-tin-oxide (ITO) or indium-zinc-oxide (IZO) is an expensive material. In addition, since indium-tin-oxide (ITO) or indium-zinc-oxide (IZO) has a relatively low sheet resistance value and high electrical conductivity, a charge or capacitance generated from a user's touch by a finger or the like can be discharged by the antistatic film 150. Moreover, the antistatic film 150 formed of PEDOT:PSS or the like may deteriorate in reliability under high-temperature or much-moisture (high-humidity) environments.

Meanwhile, the antistatic film 150 is connected to an edge of the lower substrate 120 through a first conductive member 170a, a conductive connection member 172, and a second conductive member 170b. Ground pads formed of a conductive material, although not shown, may be disposed on the edge of the lower substrate 120. A static electricity generated in the display device 100 can be discharged to the outside by the conductive materials of the antistatic film 150, the first conductive member 170a, the conductive connection member 172, the second conductive member 170b, and the lower substrate 120.

The first conductive member 170a and the second conductive member 170b may be formed of a metal material, such as silver (Ag), and the conductive connection member 172 may be also formed of a metal material. However, when the first conducive member 170a, the conductive connection member 172, and the second conductive member 170b are formed separately, a number of processes increases and thus, the manufacturing costs also increase.

Hereinafter, various exemplary embodiments of the present invention will be described in detail with reference to the accompanying drawings.

First Embodiment

Figure 2:
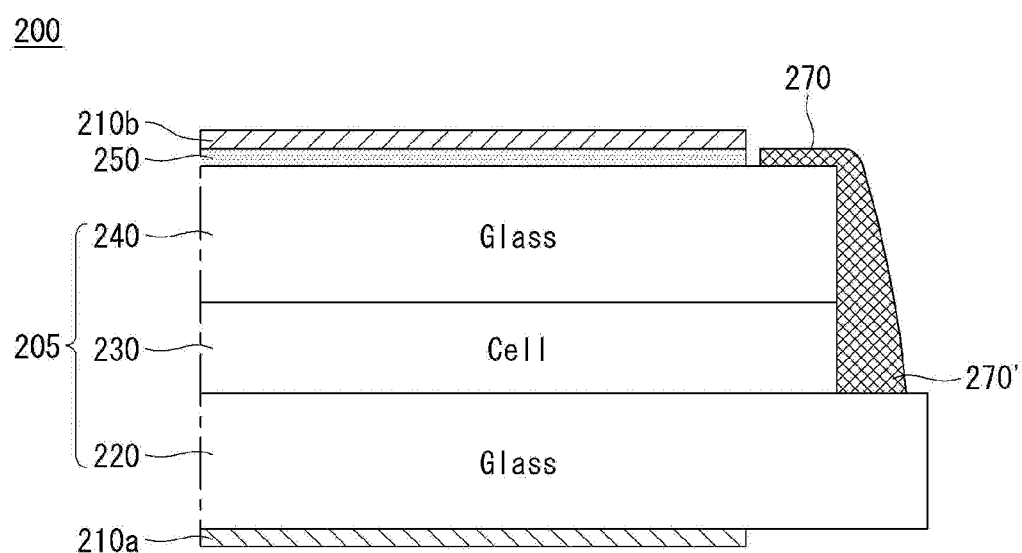
FIG. 2 is a cross-sectional view of a display device according to an embodiment of the present invention.
Figure 3:
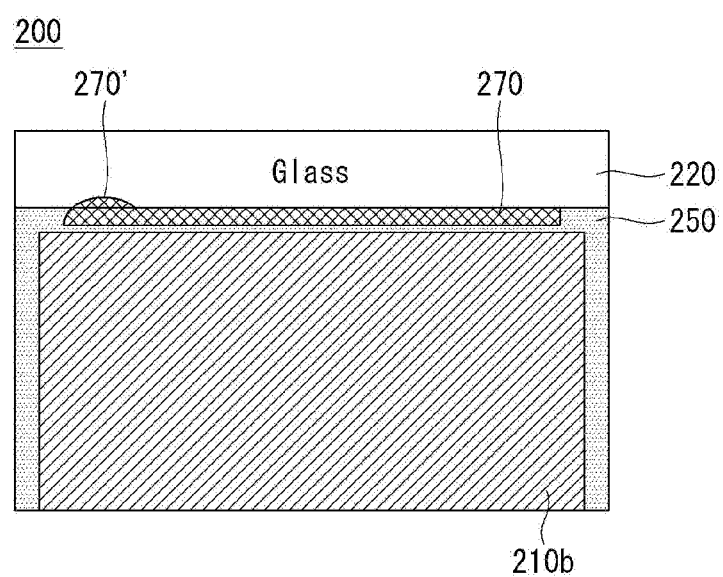
FIG. 3 is a front view of the display device of FIG. 2.

FIG. 2 is a cross-sectional view of a display device according to an embodiment of the present invention; FIG. 3 is a front view of the display device of FIG. 2; and FIG. 4 is a plane view of an antistatic film according to an embodiment of the present invention.

Figure 4:
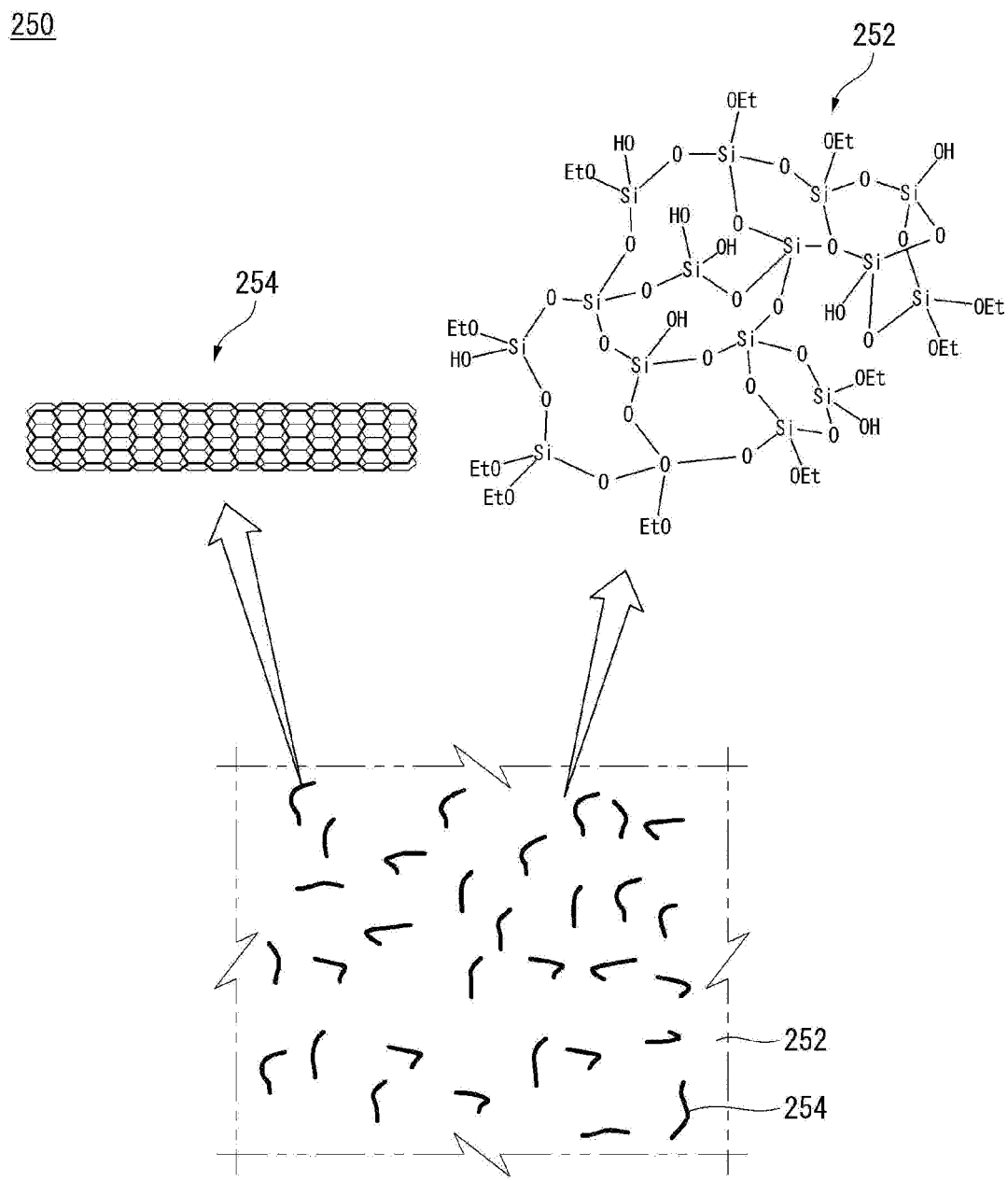
FIG. 4 is a plane view of an antistatic film according to an embodiment of the present invention.

Referring to FIGS. 2 to 4, a display device 200 includes a display panel 205 disposed on a lower polarizer 210a, an upper polarizer 210b disposed on the display panel 205, and an antistatic film 250 disposed between the upper substrate 240 of the display panel 205 and the upper polarizer 210b.

More specifically, the display panel 205 includes a lower substrate 220, a cell 230, and an upper substrate 240, which are stacked sequentially. Here, the lower substrate 220 may be an array substrate in which transistors, various signal wires, and electrodes are formed for driving cells 230, and the upper substrate 240 may be a color filter substrate including color filters (not shown) and a black matrix (not shown). Herein, the lower substrate 220 may refer to the array substrate, and the upper substrate 240 may refer to the color filter substrate. The lower substrate 220 and the upper substrate 240 may be formed of, for example, glass, but are not limited thereto.

The display panel 205 may be a liquid crystal display panel including a liquid crystal layer, and the display device 200 may be a liquid crystal display. Meanwhile, a liquid crystal display is described throughout the specification, but the present invention is not limited thereto. For example, the cell 230 may be an organic layer of an organic light emitting display device. In cases where the display device 200 is a liquid crystal display, liquid crystals may be contained in the cell 230. Thus, an electric field, which is generated by applying a voltage to the electrodes formed in the respective substrates 220 and 240, moves the liquid crystals, and the resultant variance in light transmittance allows the liquid crystal display to display images.

Touch electrodes may be formed in the cell 230. As described above, the display device 200 may be an in-cell type display device, and thus touch electrodes TE, for example, Rx and Tx electrodes, for a touch function, are embedded in the cell 230. The in-cell touch type liquid crystal display 200 has advantages, such as slim profile, low manufacturing costs, lightweight, and the like, since a separate touch panel is not attached to the liquid crystal display 200 and the touch electrodes are formed inside the display panel 205. For example, a structure for implementing a touch function, although not shown, can be an in-plane switching (IPS) mode, but is not limited thereto.

The lower polarizer 210a and the upper polarizer 210b perform a function of polarizing light to emit light to the outside of the liquid crystal display 200. However, when the lower polarizer 210a and the upper polarizer 210b are attached onto the display panel, a static electricity may be generated. Moreover, a static electricity may be generated when driving the liquid crystal display 200 for displaying images.

The antistatic film 250 is disposed to discharge such a static electricity. The antistatic film 250 may contain a matrix material 252 and carbon nanotubes (CNTs) 254 dispersed in the matrix material 252. A sheet resistance value of the antistatic film 250 may be $10^7 \Omega/\square$ to $10^9 \Omega/\square$. More specifically, the antistatic film 250 may be formed by curing a solution including the matrix material 252, the carbon nanotubes 254 dispersed in the matrix material, a solvent, a dispersion additive, and the like. The antistatic film 250 may have improved heat resistance and reliability by including the carbon nanotubes 254 dispersed in the matrix material 252.

The carbon nanotubes 254 dispersed throughout an entire surface of the antistatic film 250 exhibit very high hardness and strength in a structural point of view due to the sp$^2$ bond between the carbon atoms. Particularly, a single-wall carbon nanotube (SWCNT) may secure a Young's modulus of 5.5 TPa and a tensile strength of up to 45 GPa, and thus may be a high-strength/ultra-light composite material.

A sheet resistance value of the carbon nanotubes 254 may be $1000\Omega/\square$ to $20000\Omega/\square$. As for the in-cell touch type liquid crystal display 200, in cases where the sheet resistance value of the antistatic film 250 is too small (e.g., smaller than $10^7 \Omega/\square$), a charge or capacitance generated from a user's touch by a finger or the like may be discharged by the antistatic film 250, and thus the touch sensor may not accurately sense the user's touch. As a result, the sheet resistance value of the antistatic film 250 is desired to be increased, and thus, the sheet resistance value of the carbon nanotubes 254 is also desired to be increased to $1000\Omega/\square$ to $20000\ \Omega/\square$.

When the sheet resistance value of the carbon nanotubes 254 is smaller than $1000\Omega/\square$ and thus, the sheet resistance value of the antistatic film 250 is too small, the touch sensitivity may be lowered due to discharging. On the other hand, when the sheet resistance value of the carbon nanotubes 254 is larger than 20000Ω/□ and thus, the sheet resistance value of the antistatic film 250 is too large, the discharging effect may be reduced.

The content of the carbon nanotubes 254 in the antistatic film 250 may be adjusted depending on design values of light transmittance. Since a light transmittance of the antistatic film 250 can be reduced with an increased content of the carbon nanotubes 254, the content of the carbon nanotubes 254 may be adjusted by taking into consideration light transmittance specific for final products.

Meanwhile, the sheet resistance value of the antistatic film 250 is beneficially uniform throughout an entire surface of the antistatic film 250, and may be in a range of $10^7 \Omega/\square$ to $10^9 \Omega/\square$. As for the in-cell touch type liquid crystal display 200, in cases where the sheet resistance value of the antistatic film 250 is too small (e.g., less than $10^7 \Omega/\square$), a charge or capacitance generated from a user's touch by a finger or the like may be discharged by the antistatic film 250, and thus, the touch sensor may not accurately sense the user's touch. As a result, the antistatic film 250 has beneficially a relatively high resistance value. On the other hand, in cases where the sheet resistance value of the antistatic film 250 is too large (e.g., greater than $10^9 \Omega/\square$), the touch sensitivity may be excellent, but the electrostatic discharge effect may be delayed or reduced.

As discussed above, the sheet resistance value of the antistatic film 250 of the display device 200 according to an embodiment of the present invention is beneficially in a range of $10^7 \Omega/\square$ to $10^9 \Omega/\square$, whereby the display device 200 may easily discharge static electricity to the outside to suppress defects associated with static electricity, and at the same time, reduce or prevent lowering of touch sensitivity.

Meanwhile, one end of the antistatic film 250 is connected to an edge of the lower substrate 220 of the display panel 205 through a conductive member 270. Here, the conductive member 270 connects the antistatic film 250 and metal pads (or ground pads, not shown) of the lower substrate 220 of the display panel 205. Specifically, the conductive member 270 serves as a passage to release static electricity to the outside of the device by covering an edge of the external surface of the antistatic film 250 and being contacted with the metal pads (not shown) through a connection portion 270'. The conductive member 270 may be formed of a metal material such as gold, silver, or copper.

When compared with the first conductive member 170a, the conductive connection member 172 and the second conductive member 170b of the general display device 200 shown in FIG. 1, the conductive member 270 performs a static electricity release function as a single member, thereby decreasing a number of processes and shortening process time, leading to reduced manufacturing costs.

It should be appreciated that the shape, disposition, and the like of the conductive member 270 of the display device 200 illustrated in FIGS. 2 and 3 are merely exemplified, and the embodiments are not limited thereto.

First Experimental Example

Hereinafter, effects of an embodiment of the present invention will be described with reference to the accompanying examples.

Figure 5:
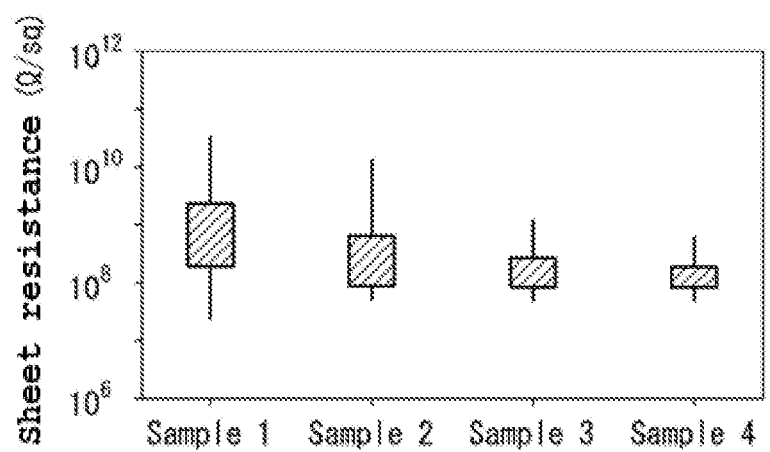
FIG. 5 is a graph showing sheet resistance uniformity of Table 1.

Table 1 shows sheet resistance values and sheet resistance uniformity of an antistatic film with respect to sheet resistance values of carbon nanotubes according to an embodiment; and FIG. 5 is a graph showing the sheet resistance uniformity of table 1.

TABLE 1

| Samples | Sheet resistance (Ω/□) | Uniformity (%) | CNT sheet resistance (Ω/□) | Hardness (H) |
|---|---|---|---|---|
| 1 | $10^{7.4}$~$10^{10.5}$ | 17.32 | 477 | 8 |
| 2 | $10^{7.7}$~$10^{10.1}$ | 12.22 | 1420 | 8 |
| 3 | $10^{7.7}$~$10^{9.1}$ | 8.33 | 1466 | 8 |
| 4 | $10^{7.7}$~$10^{8.8}$ | 6.67 | 1800 | 8 |

As shown in Table 1, as the sheet resistance value of the carbon nanotubes was increased from 477Ω/□ to 1800Ω/□, the sheet resistance uniformity of the antistatic film was improved from 17.32% to 6.67%. This result indicates that the deviation in the sheet resistance value for each region in the antistatic film is reduced.

As described above, in cases where the display device is an in-cell type liquid crystal display, the sheet resistance value of the antistatic film is beneficially in a range of $10^7 \Omega/\square$ to $10^9 \Omega/\square$ in order to maintain touch sensitivity and perform discharging function.

However, Sample 1 has the sheet resistance value of $10^{7.4} \Omega/\square$ to $10^{10.5} \Omega/\square$, with a large deviation. Also, Sample 2 has the resistance value of $10^{7.7} \Omega/\square$ to $10^{10.1} \Omega/\square$, with a large deviation. Because Samples 1 and 2 have a large deviation in sheet resistance, the discharging function may deteriorate in regions where the sheet resistance value is excessively large.

On the other hand, as can be seen from the results of Sample 4, when the sheet resistance value of carbon nanotubes is made to be 1800Ω/□, the sheet resistance value of the antistatic film is in a range of $10^{7.7} \Omega/\square$ to $10^{8.8} \Omega/\square$, and thus the antistatic film of Sample 4 can maintain touch sensitivity and perform discharging function.

FIG. 5 is a graph showing the sheet resistance uniformity of the antistatic films of Samples 1 to 4. From Sample 1 toward Sample 4, as the sheet resistance value of carbon nanotubes increases, the sheet resistance uniformity improves.

Figure 6:
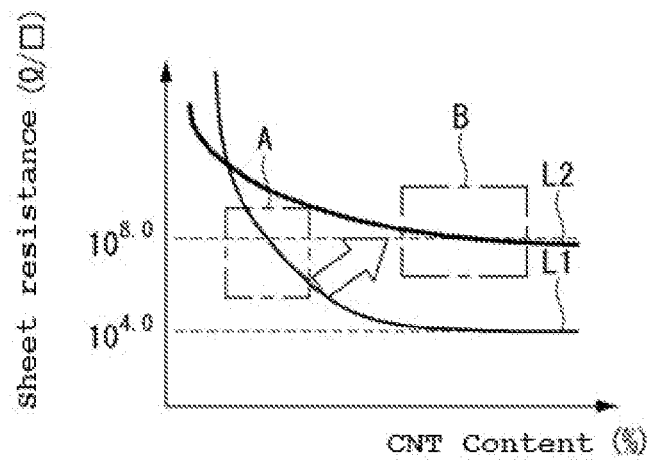
FIG. 6 is a graph showing sheet resistance values of an antistatic film over the content of carbon nanotubes according to an embodiment of the present invention.

FIG. 6 is a graph showing the sheet resistance value of an antistatic film over the content of carbon nanotubes according to an embodiment.

Referring to FIG. 6, a first line L1 indicates a sheet resistance value of an antistatic film of a general display device, and a second line L2 indicates a sheet resistance value of an antistatic film of a display device according to an embodiment of the present invention. In addition, the display device of FIG. 6 is an in-cell type liquid crystal display.

In region A of the first line L1, it can be seen that the slope is very rapid at near $10^8 \Omega/\square$, which corresponds to the sheet resistance value of the antistatic film, with which the antistatic film can perform discharging function while maintaining touch sensitivity. This indicates that the sheet resistance value of the antistatic film can change to a great extent even with a slight change in the content of carbon nanotubes, and in other words, the uniformity of the sheet resistance value is relatively low.

On the other hand, in region B of the second line L2, it can be seen that the slope is very gentle at a region in which sheet resistance value of the antistatic film is near $10^8 \Omega/\square$. This indicates that the sheet resistance value changes in a small amount, even with a relatively great change in the content of carbon nanotubes, and in other words, the uniformity of the sheet resistance value is relatively high. As a result, a display device according to an embodiment of the present invention can maintain touch sensitivity and perform antistatic function in a desired manner even with a change in the content of carbon nanotubes.

Table 2 shows light transmittance over the content and sheet resistance value of carbon nanotubes according to an embodiment of the present invention.

TABLE 2

| Samples | Light transmittance (%) | CNT Content (%) | CNT sheet resistance (Ω/□) | Hardness (H) |
|---|---|---|---|---|
| 5 | 100 | 0.13 | 1500 | 8 |
| 6 | 100 | 0.13 | 1800 | 8 |
| 7 | 99.5 | 0.26 | 5000 | 8 |
| 8 | 99.4 | 0.26 | 7000 | 8 |
| 9 | 98.7 | 0.26 | 10000 | 8 |
| 10 | 98.5 | 0.26 | 19000 | 8 |

In Table 2, the content and sheet resistance value of carbon nanotubes are shown according to design values of light transmittance. Specifically, as for a display device with a desired light transmittance of 100%, the content of the carbon nanotubes can be designed to be 0.13% and the sheet resistance value of carbon nanotubes can be designed to be 1800Ω/□. In addition, as for a display device with a desired light transmittance of 99% or more, the content of the carbon nanotubes can be designed to be 0.26% and the sheet resistance value of carbon nanotubes can be designed to be 5000 Ω/□.

It can be seen from Table 2 that when the sheet resistance value of the antistatic film, with which the antistatic film can maintain touch sensitivity and perform discharging function in a desired manner, is maintained, the light transmittance can be controlled by adjusting the content and sheet resistance value of carbon nanotubes.

Figure 7:
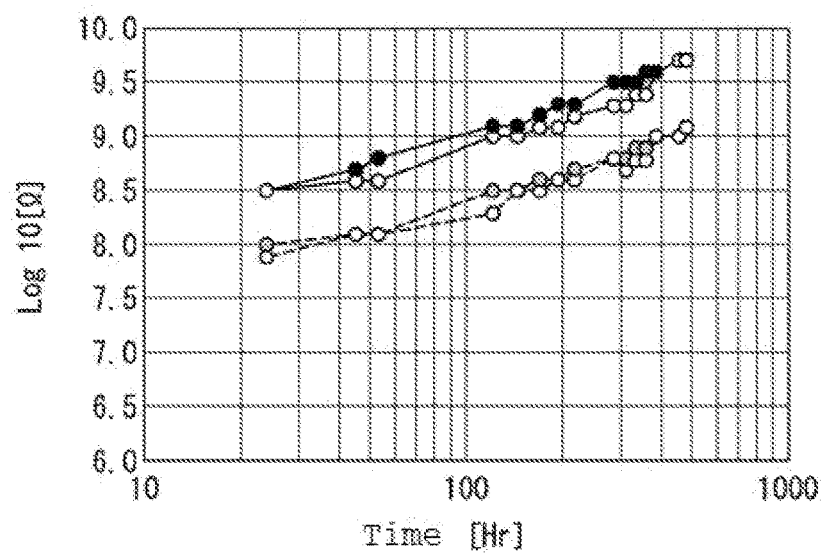
FIG. 7 is a graph showing a change in sheet resistance over time in a general antistatic film.
Figure 8:
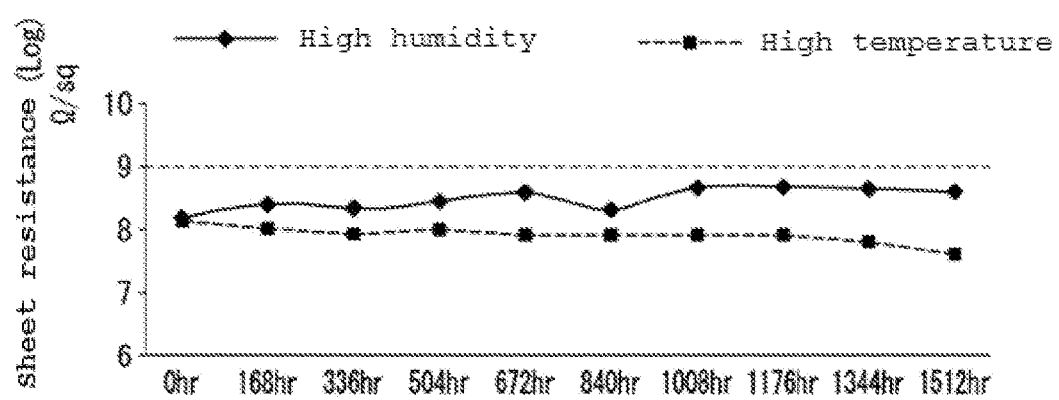
FIG. 8 is a graph showing a change in sheet resistance under high-temperature and high-humidity environments in an antistatic film according to an embodiment of the present invention.

FIG. 7 is a graph showing a change in the sheet resistance value over time in a general antistatic film; and FIG. 8 is a graph showing a change in the sheet resistance value under high-temperature and high-humidity environments in an antistatic film according to an embodiment of the present invention.

FIG. 7 shows a change in the sheet resistance value of the antistatic film over time under an environment of 95° C., when the antistatic film is formed of a conductive polymer material, PEDOT:PSS. It can be seen from FIG. 7 that the sheet resistance value continuously increases over time. Specifically, it can be seen that the sheet resistance value was increased to 9.7Ω/□ when the initial sheet resistance value was set to approximately 8.5Ω/□, and the sheet resistance value was increased to 9.2Ω/□ when the initial sheet resistance value was set to approximately 8.0Ω/□.

On the other hand, as for the antistatic film according to an embodiment of the present invention, it can be seen from FIG. 8 that, when an antistatic film having an initial sheet resistance value of about 8Ω/□ was exposed to 105° C. for 1500 hours, the sheet resistance value was little changed. These results were similar or the same even when the antistatic film was exposed to much-moisture (or high-humidity) environments.

These experimental results indicate that the antistatic film according to an embodiment of the present invention had excellent heat resistance and reliability compared with a general antistatic film.

Figure 9:
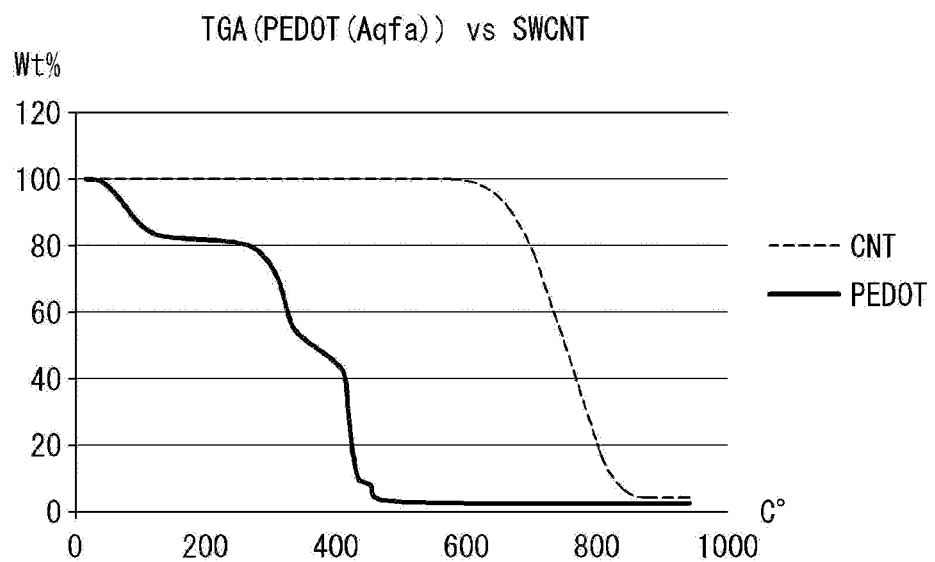
FIG. 9 is a graph showing weight % over temperature in a general antistatic film and weight % over temperature in an antistatic film according to an embodiment of the present invention.

FIG. 9 is a graph showing wt % over temperature in a general antistatic film and wt % over temperature in an antistatic film according to an embodiment of the present invention.

FIG. 9 shows analysis results of a general antistatic film and an antistatic film according to an embodiment of the present invention by a thermo gravimetric analyzer (TGA). The thermo gravimetric analyzer measures mass change through application of heat to a sample as a function of temperature.

It can be seen from FIG. 9 that, as for the antistatic film of the general display device, PEDOT:PSS, which is a conductive polymer contained in the antistatic film, was all lost due to application of heat at a temperature of about 500° C. On the other hand, it can be seen from FIG. 9 that, as for the antistatic film of the display device according to an embodiment of the present invention, the carbon nanotubes were not lost but left up to about 900° C. These results indicate that the antistatic film according to an embodiment of the present invention had an excellent heat resistance compared with a general antistatic film.

As discussed above, a display device having a touch function according to an embodiment of the present invention includes an antistatic film having a sheet resistance value of $10^7 \Omega/\square$ to $10^9 \Omega/\square$ and a uniform sheet resistance value. The display device discharges static electricity generated during the manufacturing processes to suppress defects associated with static electricity and maintains touch sensitivity in a desired manner. Also, an antistatic film according to an embodiment of the present invention may have improved sheet resistance uniformity, heat resistance and reliability, and may reducing the manufacturing costs.

Second Embodiment

Hereinafter, a carbon nanotube dispersion liquid composition and a conductive coating liquid composition containing the same for manufacturing an antistatic film according to an embodiment of the present invention will be described.

Figure 10:
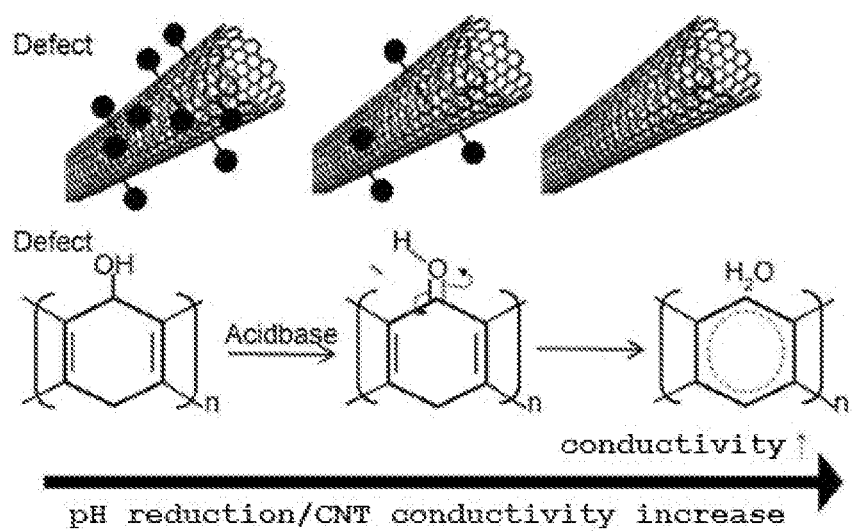
FIG. 10 is a schematic view illustrating healing of carbon nanotubes according to an embodiment of the present invention.
Figure 11:
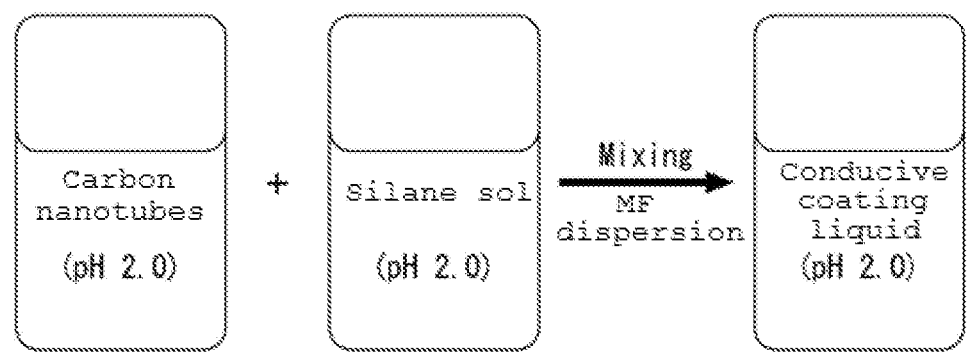
FIG. 11 is a schematic view illustrating a method of manufacturing a conductive coating liquid composition in which a carbon nanotube dispersion liquid is mixed with a silane sol.

FIG. 10 is a schematic view illustrating a healing of carbon nanotubes according to an embodiment of the present invention; and FIG. 11 is a schematic view illustrating a method of manufacturing a conductive coating liquid composition in which a carbon nanotube dispersion liquid is mixed with a silane sol.

A carbon nanotube dispersion liquid composition according to an embodiment of the present invention contains carbon nanotubes, a polyacrylic acid resin, and $C_2$-$C_5$ straight-chain alkanol, and may significantly improve dispersibility and stability after carbon nanotubes are dispersed. The carbon nanotube dispersion liquid composition is used together with a silane sol for a conductive coating liquid composition, and thus can form a coating film having excellent chemical stability and electrical conductivity and can improve the uniformity of the coating film.

<Carbon Nanotube Dispersion Liquid Composition>

The carbon nanotube dispersion liquid composition according to an embodiment of the present invention contains carbon nanotubes, a polyacrylic acid resin, and $C_2$-$C_5$ straight-chain alkanol.

Carbon Nanotubes

Carbon nanotubes are a material with an excellent conductivity. A coating film formed by including the carbon nanotubes can exhibit an excellent electrical conductivity and secure an excellent mechanical strength, and thus can be applied to various electronic products such as a conductive layer, an antistatic film, or the like, of a display device.

The carbon nanotubes (CNTs) may be prepared by a general method, such as arc discharge, laser deposition, plasma enhanced chemical vapor deposition, vapor synthesis, or pyrolysis, and then may be thermally treated. Carbon impurities, such as amorphous carbon or crystalline graphite particles, and catalyst transition metal particles are present together with the synthesized carbon nanotubes in the product produced by the above synthesis methods.

For example, in cases of the arc discharge method, 15 to 30 wt % of carbon nanotubes, 45 to 70 wt % of carbon impurities, and 5 to 25 wt % of catalyst transition metal particles are contained in 100 wt % of the product. When such carbon nanotubes containing the impurities are used without purification, the dispersibility and coatability of an impregnating liquid deteriorates, and distinctive physical properties of carbon nanotubes may not be properly expressed. Thus, an embodiment of the present invention employs carbon nanotubes, of which impurities are removed by thermally treating a CNT product prepared by, for example, an arc discharge method.

Specifically, a CNT product prepared by, for example, the above synthesis method is made into a sheet or granules with an average diameter of 2 to 5 mm, and fed into a rotary reactor that is downwardly inclined to 1° to 5° with respect to a progress direction. While the rotary reactor is heated at 350 to 500° C., an oxidative gas is supplied at a rate of 200-500 cc/min with respect to 1 g of the fed product, followed by a thermal treatment for 60 to 150 minutes. Here, the inclined rotary reactor is rotated at a speed of 5 to 20 rpm, so that the CNT product is dispersed to increase or maximize a contact surface area, and automatically moved in a progress direction to increase or maximize the contact surface area with the oxidative gas, and thus, the CNT product is thermally treated while a local oxidation thereof is reduced or prevented. By this method, the weight of the fed product can be reduced by 60 to 85%, thereby obtaining high-purity carbon nanotubes.

The carbon nanotubes containing 40 wt % or less, more preferably 25 wt % or less of carbon impurities, based on the total 100 wt % thereof, are preferable in view of securing conductivity as well as dispersibility and stability.

The carbon nanotubes may be single-wall carbon nanotubes, double-wall carbon nanotubes, or multi-wall carbon nanotubes, which may be used alone or in a combination of two or more thereof. The single-wall carbon nanotubes are preferable in view of improving interactions with other components, which will be discussed below in more detail.

The content of the carbon nanotubes according to an embodiment of the present invention may be, but is not particularly limited to, 0.05 to 20 wt %, preferably 0.1 to 10 wt %, and more preferably 0.1 to 1 wt %, based on the total weight of the dispersion liquid composition. If the content of the carbon nanotubes is within the above range, the carbon nanotubes can exhibit an excellent dispersibility, and easily secure electrical conductivity, scratch resistance, and transmittance of a coating film.

Polyacrylic Acid Resin

A polyacrylic acid resin according to an embodiment of the present invention is a component that serves as a dispersant for effectively dispersing carbon nanotubes. The polyacrylic acid resin can be well dissolved in a particular dispersion medium as described later, and can be well combined with carbon nanotubes, which are hydrophobic. In addition, through an electrostatic repulsion between carbon nanotube strands and a steric hindrance effect due to distinctive characteristics of the polymer chain, the dispersibility of carbon nanotubes can be improved and the re-aggregation of carbon nanotubes can be reduced or prevented.

The content of the polyacrylic acid resin according to an embodiment of the present invention may be, but is not particularly limited to, 0.02 to 40 wt %, preferably 0.05 to 10 wt %, and more preferably 0.1 to 1 wt %, based on the total weight of the dispersion liquid composition. If the content of the polyacrylic acid resin is within the above range, a proper range of the polyacrylic acid resin is dissolved in the composition, and thus the activity thereof to disperse the carbon nanotubes can be improved.

The weight average molecular weight of the polyacrylic acid resin according to an embodiment of the present invention may be, but is not particularly limited to, for example 2,000 to 3,000,000, and preferably 8,000 to 12,000. If the weight average molecular weight of the polyacrylic acid resin is within the above range, the polyacrylic acid resin can easily permeate between carbon nanotube strands, and can have a steric hindrance effect suitable for reducing or preventing re-aggregation. In addition, the polyacrylic acid resin may be present in the dispersion liquid composition while well dissolved in the dispersion medium, thereby effectively dispersing the carbon nanotubes.

The dispersion liquid composition of an embodiment of the present invention may contain a small amount of water, and thus the polyacrylic acid resin may be contained in the dispersion medium while dissolved or emulsified in water, but is not limited thereto.

$C_2$-$C_5$ Straight-Chain Alkanol

A $C_2$-$C_5$ straight-chain alkanol according to an embodiment of the present invention is a dispersion medium for effectively dispersing carbon nanotubes, or a hydrophilic alcohol-based solvent, and can improve the dispersion stability of carbon nanotubes through an interaction with the above-described polyacrylic acid resin. If a branched-chain alkanol instead of the straight-chain alkanol is used as a dispersion medium, the solubility and stability of the polyacrylic acid resin with respect to the dispersion medium deteriorate, and thus it may be difficult to maintain dispersion stability within a proper range, but should not be construed to be limited thereto.

Specific examples of the $C_2$-$C_5$ straight-chain alkanol according to an embodiment of the present invention may be ethanol, n-propanol, n-butanol, n-butanol, n-pentanol, and the like, preferably one of ethanol, n-propanol, n-butanol, n-butanol, n-pentanol, and more preferably n-propanol.

The content of the alkanol according to an embodiment of the present invention may be, but is not limited to, for example, 50 to 99.93 wt %, and preferably 80 to 99 wt %, based on the total weight of the composition. If the content of the alkanol is within the above range, the viscosity of the dispersion liquid can be maintained to be low, and thus the dispersion stability of the carbon nanotubes can be further improved, and the alkanol can be effectively mixed with a binder component when applied to a coating film.

Additional Dispersant

The carbon nanotube dispersion liquid composition according to an embodiment of the present invention may further contain an additional dispersant if desired, and a type of such an additional dispersant is not particularly limited, and may be an acrylic block copolymer dispersant.

Herein, the acrylic block copolymer means a copolymer in which different acrylic monomers polymerize to make blocks, respectively, and means a copolymer formed as AAAAAABBBBBB if the respective monomers are A and B. The acrylic block copolymer dispersant can further improve the dispersion stability through a polar separation of the carbonyl group in the copolymer. In addition, the acrylic block copolymer may beneficially contain at least one functional group, such as an amine group or a carboxyl group, in each monomer. The content of monomers containing the substituent is adjusted, and thus the ratio of hydrophilic components and the hydrophobic components is adjusted, thereby further improving dispersibility of carbon nanotubes. Specific examples of the acrylic copolymer dispersant, which are on the market, may be a polymer dispersant, such as DISPERBYK 2001 or DISPERBYK 2155 from BYK company.

The content of the additional dispersant may be contained in 0.1 to 2 wt %, and preferably 0.5 to 1 wt %, based on the total weight of the composition, but is not particularly limited thereto. If the content of the additional dispersant is within the above range, deterioration in scratch resistance and increase in viscosity due to the use of the additional dispersant can be reduced or prevented, and thus the dispersion stability can be effectively maintained.

The carbon nanotube dispersion liquid composition according to an embodiment of the present invention may further contain a small amount of water if desired. Water may be used for improving the solubility and dispersibility of the above-described components. For example, water may be used as a solvent for improving the dispersion activity of the polyacrylic acid resin, but is not limited thereto.

<Manufacturing Method of Carbon Nanotube Dispersion Liquid Composition>

A method for manufacturing a carbon nanotube dispersion liquid composition containing the above-described components will now be described.

First, carbon nanotubes, a polyacrylic acid resin, and $C_2$-$C_5$ straight-chain alkanol are mixed. The polyacrylic acid resin may be prepared in advance in a form of aqueous solution before being mixed, and the concentration of the aqueous solution is not particularly limited, but the solid content of the polyacrylic acid resin may be preferably 0.02 to 40%, and more preferably 20 to 30 wt %, based on the total content of the carbon nanotube dispersion liquid composition. Specific types and mixed contents of the respective components of the carbon nanotube dispersion liquid composition are as described above.

Next, after the respective components of the carbon nanotube dispersion liquid composition are mixed, a high-pressure dispersion is conducted at 1000 to 1800 bar. When the dispersion process is conducted under a high pressure of 1000 to 1800 bar, carbon nanotubes can be allowed to collide with each other with an appropriate shear stress, and thus carbon nanotube strands can be effectively dispersed, so that the carbon nanotubes are homogenously dispersed in the composition substantially without aggregation, thereby effectively performing interactions with the polyacrylic acid resin and the alkanol.

If the pressure for dispersion is lower than 1000 bar, the energy transferred to the carbon nanotubes is low, resulting in deterioration in dispersion effects. If the pressure for dispersion is higher than 1800 bar, the polymer chains of the polyacrylic acid resin are broken due to high energy, resulting in deterioration in the stearic hindrance effect and degrading the dispersion stability. The pressure for dispersion may be more preferably 1200 to 1600 bar, and in such a case, the above-described effects can be further improved.

The dispersion may be conducted by jetting the composition using a nozzle with a predetermined diameter at the pressure range described as above, and here, the diameter of the nozzle, through which the composition is jetted, may be 50 μm to 400 μm, and preferably 80 μm to 200 μm. In addition, the dispersion may be conducted by serial nozzles with different sizes and simultaneously using the nozzles, or separately using the nozzles in twice.

In cases where the nozzles within the above range are used, the process can be easily conducted at a high pressure of 1,000 bar to 1,800 bar, thereby achieving an effective dispersion.

The diameter and flow rate of the nozzle may be selected within an appropriate and suitable range to achieve the above pressure range.

In addition, a stirring process may be further conducted prior to the high-pressure dispersion process, and the efficiency of the high-pressure dispersion process can be further improved by optimizing the mixing of the composition.

<Conductive Coating Liquid Composition>

Hereinafter, a conductive coating liquid composition containing 10 to 100 parts by weight of a silane sol based on 100 parts by weight of the above-described carbon nanotube dispersion liquid composition will be described.

Carbon Nanotube Dispersion Liquid Composition

The carbon nanotube dispersion liquid composition may have the same components and contents thereof as in described above, and a carbon nanotube dispersion liquid composition that is manufactured by the high-pressure dispersion method as described above may be used.

Silane Sole

The silane sol according to an embodiment of the present invention serves a binder in the coating liquid composition, and may include an alkoxysilane compound, an acidic catalyst, an alcohol-based solvent, and water.

Alkoxysilane Compound

The alkoxy silane compound according to an embodiment of the present invention is a binder resin, and the type thereof is not particularly limited, but examples thereof may be tetraalkoxy silane compounds, such as tetraethoxysilane, tetramethoxysilane, and tetra-n-propoxysilane; alkylalkoxysilanes of substituted or unsubstituted straight- or branched-chain alkyl groups, such as methyl trimethoxysilane, methyl triethoxysilane, ethyl triethoxysilane, ethyl trimethoxysilane, methyl tripropoxysilane, methyl tributoxysilane, propyl trimethoxysilane, propyl triethoxysilane, isobutyl triethoxysilane, isobutyl trimethoxysilane, octyl triethoxysilane, octyl trimethoxysilane, and methacryloxydecyl trimethoxysilane; phenyl trimethoxysilane, phenyl triethoxysilane, phenyl tripropoxysilane, and phenyl tributoxysilane; 3-aminopropyl trimethoxysilane, 3-aminopropyl triethoxysilane, 2-aminoethyl-3-aminopropyl trimethoxysilane, N-β-(aminoethyl)-γ-aminopropyl trimethoxysilane, N-(n-butyl)-3-aminopropyl trimethoxysilane, 3-aminopropylmethyl diethoxysilane; dimethyl dimethoxysilane, diethyl diethoxysilane, γ-glycidyloxypropyl trimethoxysilane, γ-glycidyloxypropyl triethoxysilane, vinyl trimethoxysilane, vinyl triethoxysilane, 3-mercaptopropyl trimethoxysilane; and fluoroalkyl silanes, such as tridecafluoro-1,1,2,2-tetrahydrooctyl triethoxysilane, trifluoropropyl trimethoxysilane, heptadecafluorodecyl trimethoxysilane, and heptafluorodecyl triisopropoxylsilane, and these may be used alone or in a mixture of two or more thereof.

Of theses, alkyl alkoxysilane compounds having $C_1$-$C_{20}$ alkyl groups are preferable, and more preferably, a tetraethoxysilane compound may be used.

The content of the alkoxysilane compound according to an embodiment of the present invention is not particularly limited, but may be 20 to 60 wt %, and preferably 30 to 50 wt %, based on the total weight of the silane sol. If the content of the alkoxysilane compound is within the above range, a sol-gel reaction may favorably occur, and the obtained silane sol may have favorable physical properties and an excellent adhesion, and thus may be easy to form a coating film, and may be more suitable when coated on a glass substrate.

Acidic Catalyst

The acidic catalyst according to an embodiment of the present invention is for promoting the hydrolysis of water and an alkoxysilane and providing a proper degree of cross-linkage. The type thereof is not particularly limited, but examples thereof may be hydrochloric acid, sulfuric acid, phosphoric acid, nitric acid, acetic acid, and diluted hydrofluoric acid, which may be used alone or in a mixture of two or more thereof. The used acidic catalyst may be contained in a form of aqueous solution at the time of mixing.

The content of the acidic catalyst according to an embodiment of the present invention is not particularly limited, but may be 0.01 to 10 wt %, and preferably 0.05 to 5 wt %, based on the total weight of the silane sol. If the content of the acidic catalyst is within the above range, a coating film with a proper degree of cross-linkage may be formed.

Alcohol-Based Solvent

The type of the alcohol-based solvent according to an embodiment of the present invention is not particularly limited, but a hydrophilic alcohol-based solvent may be preferable in view of compatibility with the carbon nanotube dispersion liquid, and examples thereof may be methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol, or cyclohexanol, which may be used alone or in a mixture of two or more thereof. Of these, in view of improving stability with the carbon nanotube dispersion liquid, ethanol, n-butanol, n-propanol, and n-pentanol may be preferable, and n-propanol may be more preferable.

The content of the alcohol-based solvent according to an embodiment of the present invention is not particularly limited, but may be 10 to 70 wt %, and preferably 20 to 50 wt %, based on the total weight of the silane sol. If the content of the alcohol-based solvent is within the above range, the reactivity of the sol-gel reaction may be further improved.

Water

The water according to an embodiment of the present invention is a component for a hydrolysis reaction with the alkoxy silane, and the content thereof is not particularly limited, but may be 5 to 60 wt %, and preferably 8 to 35 wt %, based on the total weight of the silane sol. If the content of water is within the above range, sufficient hydrolysis occurs, leading to an excellent adhesive strength to a substrate.

Additives

The conductive coating liquid composition according to an embodiment of the present invention may further contain additives if desired, in addition to the above-described carbon nanotube dispersion liquid and the silane sol.

Examples of the usable additive may include, but are not limited to, a dispersing agent, a silane coupling agent, a leveling agent, a slip agent, a surfactant, a pH adjusting agent, a fast drying agent, and a viscosity controlling agent, which may be used alone or in a mixture of two or more thereof.

More specifically, the conductive coating liquid composition may further contain a slip agent for improving slip property of the coating film, and the type of the slip agent is not particularly limited, but a commercial example thereof may be BKY333 from BYK company, but is not limited thereto. In addition, the dispersing agent of BYK 2001 as described above may be further used.

In addition, the polar solvent, such as ethylene glycol, dimethyl formamide, or 1-methyl-2-pyrrolidone, increases a repulsive force by the carboxylic group of the polyacrylic acid resin surrounded by the carbon nanotubes in the dispersion liquid, thereby increasing or maximizing dispersibility and thus improving the distribution of the carbon nanotubes, which are conductive fillers in a coating film state, leading to improvement in electrical conductivity. In addition, these are beneficial in securing an appropriate viscosity at the time of coating, and control the drying rate to an appropriate range at the time of coating, thereby achieving a uniform coating film. In addition, ethylene glycol, dimethyl formamide, or 1-methyl-2-pyrrolidone may further improve conductivity due to the inherent dielectric constant thereof, and thus may be more suitable to achieve a low-resistance coating film.

The additional additives may be used alone or in a mixture of two or more thereof, and the contents thereof are not particularly limited, but may be 0.01 to 10 wt %, and preferably 0.1 to 5 wt % based on the total weight of the conductive coating liquid composition. If the contents of the additional additives are within the above range, the additives may implement the inherent effects thereof substantially without degrading the desired effects of an embodiment of the present invention.

The silane sol according to an embodiment of the present invention may be prepared by conducting a reaction of the above-described components under predetermined conditions. The reaction conditions are not particularly limited, but may include a procedure of conducting heating and stirring at 30 to 90° C. The reaction time is not particularly limited, and for example, the reaction may be conducted for 4 to 30 hours. In addition, a reactor for the reaction may include a reflux cooling tube. After the reaction, the product may be rotary evaporated and concentrated, and then diluted in a particular solvent, before use. Thus, particularly, in cases where the coating liquid is applied to a glass substrate, the prepared silane sol may provide a strong adhesion to secure excellent strength characteristics.

The conductive coating liquid composition according to an embodiment of the present invention may be manufactured by separately preparing the carbon nanotube dispersion liquid and the silane sol, and then mixing the carbon nanotube dispersion liquid and the silane sol.

Referring to FIGS. 10 and 11, the carbon nanotube dispersion liquid is subjected to a pH-lowering process using an acidic catalyst. If the pH of the carbon nanotubes is lowered, the carbon nanotubes proceed with a reduction reaction of healing defects so that the carbon nanotubes are stabilized. The reduction of the carbon nanotubes may improve electrical conductivity, but may cause deterioration in room-temperature stability. As a result, when the carbon nanotubes are stabilized after the pH of the carbon nanotube dispersion liquid is lowered, the carbon nanotube dispersion liquid may be mixed with a silane sol having a similar pH to the carbon nanotube dispersion liquid to reduce or minimize an additional conductivity change of carbon nanotubes due to the acidity of the silane sol, thereby securing stability at room temperature.

The pH of the carbon nanotube dispersion liquid according to an embodiment of the present invention may be 1.7 to 3.5. If the pH of the carbon nanotube dispersion liquid is 1.7 or higher, the defects for high resistance of the carbon nanotubes may be extinct, thereby reducing or preventing the resistance of the carbon nanotubes from being lowered to a great extent. If the pH of the carbon nanotube dispersion liquid is 3.5 or lower, the failure of cross-linking due to the mixing of a too small amount of the acidic catalyst may be reduced or prevented. A difference between the pH of the carbon nanotube dispersion liquid and the pH of the silane sol is preferably within 0.3. More preferably, the pH of the carbon nanotube dispersion liquid and the pH of the silane sol may be the same as each other at 2.00.

The silane sol according to an embodiment of the present invention is formed to have a low pH. As the pH of the silane sol is lower, the gel reaction and the hydrolysis of the silane sol are delayed, and thus, the pH change of the coating liquid due to the hydrolysis may become smaller, thereby improving the stability of the coating liquid. The pH of the silane sol may be controlled by adjusting the content of the acidic catalyst. For example, the more the content of the acidic catalyst in the silane sol, the lower the pH of the silane sol.

The conductive coating liquid composition according to an embodiment of the present invention may be manufactured by mixing 10 to 100 parts by weight of the silane sol based on 100 parts by weight of the carbon nanotube dispersion liquid composition.

If the content of the silane sol mixed is less than 10 parts by weight, it may be difficult to secure a desired adhesive strength of the coating layer, and if the content of the silane sol mixed is more than 100 parts by weight, the coatability of the coating layer may deteriorate. In addition, the mixing ratio may be such that, based on 100 parts by weight of the carbon nanotube dispersion liquid composition, the silane sol may be mixed in 25 to 60 parts by weight or 10 to 20 parts by weight. The mixing of 25 to 60 parts by weight of the silane sol may be suitable to achieve a high-resistance coating film, and the mixing of 10 to 20 parts by weight of the silane sol may be suitable to achieve a low-resistance coating film.

The mixing method is not particularly limited, but may be conducted by an ultrasonic disperser, a high-pressure disperser, a homogenizer, a mill, or the like. Preferably, in cases where the same high-pressure dispersion process as in the preparation of the carbon nanotube dispersion liquid is employed, the dispersibility and stability of the final coating liquid can be secured.

The conductive coating liquid composition containing the above-described components can achieve a coating film with an uniform and excellent electrical conductivity at the time of forming a coating film, and can be applied to a display device due to its excellent mechanical strength thereof.

<Display Device>

A display device including an antistatic film formed of the above-described conducive coating liquid composition will now be described. Hereinafter, an in-cell touch type display device according to an embodiment of the present invention will be described in more detail.

Figure 12:
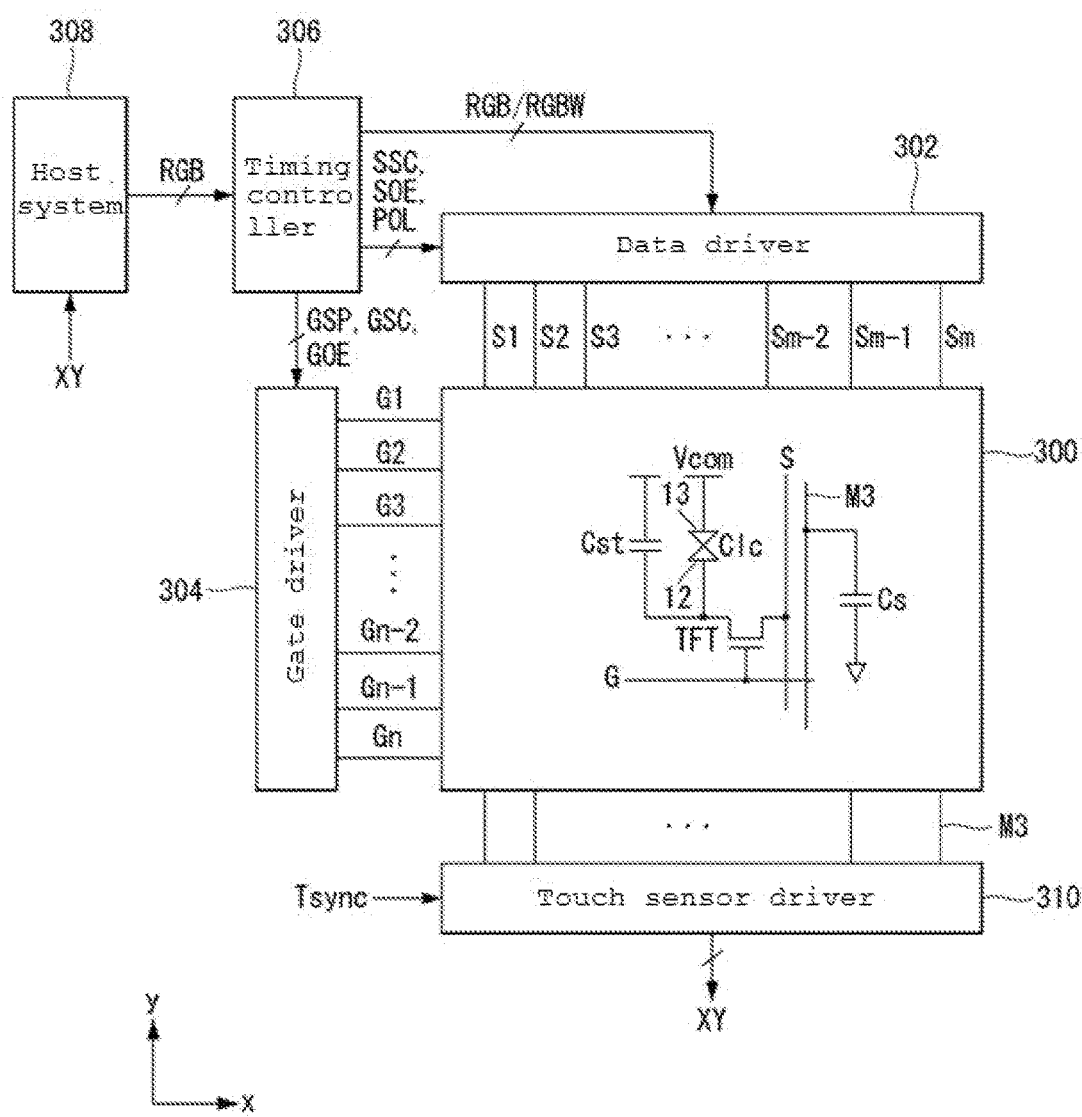
FIGS. 12 and 13 are schematic views illustrating a display device according to an embodiment of the present invention.
Figure 13:
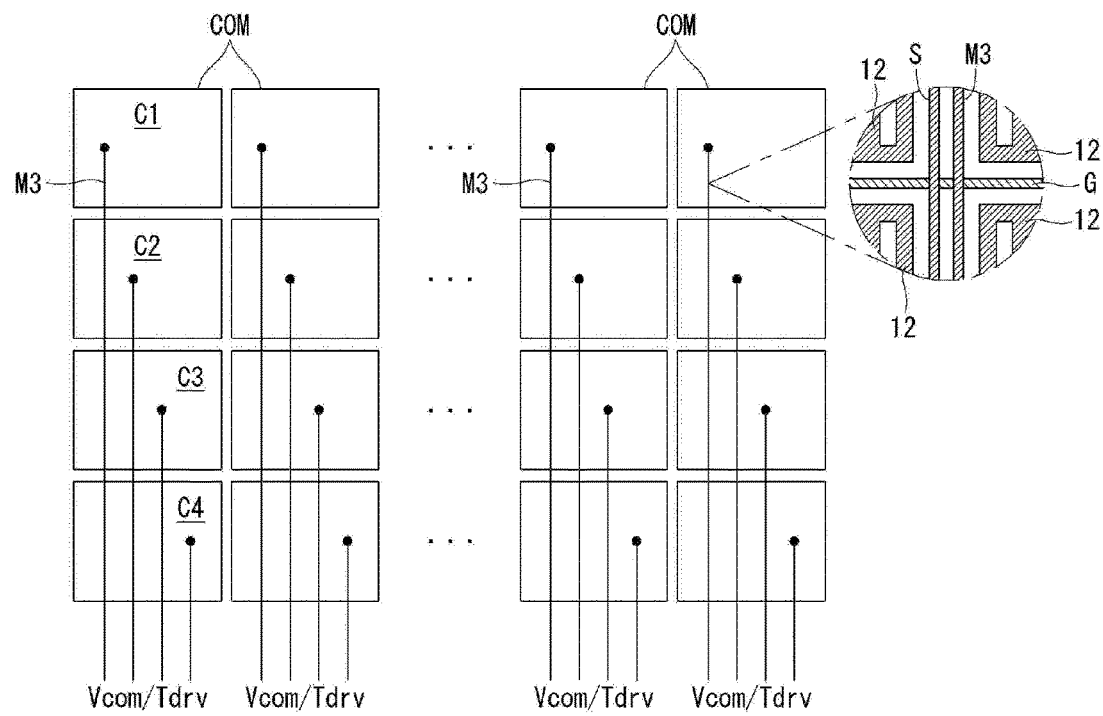
Figure 14:
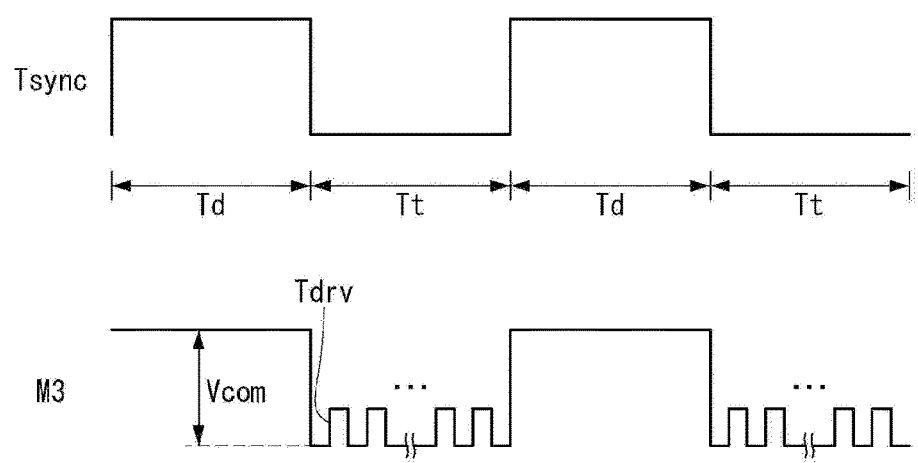
FIG. 14 shows waveform diagrams of a common voltage (Vcom) and a touch driving signal (Tdrv) applied to a touch sensor (Cs) illustrated in FIG. 12.

FIG. 12 and FIG. 13 are schematic views illustrating a display device according to an embodiment of the present invention. FIG. 14 shows waveform diagrams of a common voltage Vcom and a touch driving signal Tdrv applied to a touch sensor Cs illustrated in FIG. 12.

Referring to FIGS. 12 to 14, a display device according to an embodiment of the present invention includes a touch sensing device. The touch sensing device senses a touch input using touch sensors Cs embedded in a display panel 300. When a finger is contacted with a self-capacitance type touch sensor Cs, the capacitance increases, and thus the touch sensing device can sense a touch input on a basis of a change in the capacitance of the touch sensor Cs.

A liquid crystal layer is formed between two substrates in the display panel 300. The liquid crystal molecules are driven by an electric field generated due to a potential difference between a data voltage applied to a pixel electrode 12 and a common voltage Vcom applied to a sensor electrode 13. A pixel array of the display panel 300 includes a plurality of pixels defined by data lines S or S1-Sm (m is a positive integer) and gate lines G or G1-Gn (n is a positive integer), and touch sensors Cs connected to the pixels.

The touch sensor Cs includes a sensor electrode and a sensor wire M3 connected to the sensor electrode. The sensor electrodes COM or C1-C4 may be patterned in a manner in which the existing common electrode is divided. The sensor electrodes COM or C1-C4 overlap a plurality of pixels, respectively. The sensor electrodes COM or C1-C4 receive the common voltage Vcom through the sensor wire M3 during a display driving period (Td), and receive a touch driving signal Tdrv during a touch sensor driving period (Tt). The common voltage Vcom is commonly applied to the pixels through the sensor electrodes.

The sensor wires M3 are disposed at boundaries between sub-pixels while evading positions of spacers. The sensor wires M3 may overlap the data lines S1-Sm with an insulating layer (not shown) therebetween, so that the opening areas of the pixels may not be reduced.

Since the touch sensors Cs are embedded in the pixel array of the pixel panel 300, the touch sensors Cs are connected to the pixels through parasitic capacitances. In order to reduce mutual influence due to a coupling of the pixels and the touch sensors Cs, the display panel 300 is beneficially driven in a manner in which a first frame period is time-divided into a period for driving the pixels (hereinafter, referred to as "display driving period") and a period for driving the touch sensors (hereinafter, referred to as "touch sensor driving period"), as illustrated in FIG. 14. Here, one frame period may be divided into at least one display driving period (Td) and at least one touch sensor driving period (Tt). During the display driving period (Td), image data corresponding to an input image are input to the pixels. During the touch sensor driving period (Tt), the touch sensors are driven to sense a touch input.

Each of the pixels includes a pixel thin film transistor (TFT) formed near each crossing of the data lines S1-Sm and the gate lines G1-Gn, a pixel electrode receiving a data voltage through the pixel TFT, a common electrode receiving a common voltage Vcom, and a storage capacitor Cst connected to the pixel electrode to hold a voltage of the liquid crystal cell.

A black matrix, color filters, and the like may be formed on the upper substrate of the display panel 300. The lower substrate of the display panel 300 may be implemented in a color filter on TFT (COT) structure. In such a case, the color filters may be formed on the lower substrate of the display panel 100. Polarizing plates are respectively attached to the upper and lower substrates of the display panel 300, and alignment films for setting a pre-tilt angle of liquid crystals are respectively formed on inner surfaces of the upper and lower substrates, which are contacted with liquid crystals. Spacers for maintaining a cell gap of the liquid crystal layer are formed between the upper and lower substrates the display panel 300.

A backlight unit may be disposed below a rear surface of the display panel 300. The backlight unit may be implemented in an edge type backlight unit or a direct type backlight unit to irradiate light to the display panel 300. The display panel 300 may be implemented in any known liquid crystal mode, such as a twisted nematic (TN) mode, a vertical alignment (VA) mode, an in-plane switching (IPS) mode, or a fringe field switching (FFS) mode. A self-light emitting display device, such as an organic light emitting diode display device, typically does not need the backlight unit.

The display device further includes display driving parts 302, 304, and 306 for inputting the image data of an input image to the pixels and a touch sensor driver 310 for driving the touch sensors Cs. The display drivers 302, 304, and 306, and the touch sensor driver 310 are synchronized with each other in response to a synchronization signal Tsync.

The display drivers 302, 304, and 306 input the image data to the pixels during the display driving period (Td). Since the TFTs are in an off state during the touch sensor driving period (Tt), the pixels hold a data voltage that has been charged during the display driving period (Td). The display drivers 302, 304, and 306 may supply an alternating signal to the signal lines S1-Sm and G1-Gn, the alternating signal having the same phase as the touch driving signal Tdrv that is applied to the touch sensors Cs in order to reduce or minimize the parasitic capacitance between the touch sensors Cs and the signal lines connected to the pixels during the touch sensor driving period Tt. Here, the signal lines connected to the pixels are the data lines S1-Sm and the gate lines G1-Gn.

The display drivers 302, 304, and 306 include a data driver 302, a gate driver 304, and a timing controller 306.

The data driver 302 converts digital video data RGB or RGBW of an input image, which are received from the timing controller 306 during the display driving period Td, into an analog positive/negative polarity gamma compensation voltage to output a data voltage. The data voltage output from the data driver 302 is supplied to the data lines S1-Sm. The data driver 302 may apply an alternating signal to the data lines S1-Sm, the alternating signal having the same phase as the touch driving signal Tdrv applied to the touch sensors during the touch sensor driving period Tt. This is because both voltages at the parasitic capacitance change at the same time, and the smaller the voltage difference, the smaller the charge amount of the parasitic capacitance.

The gate driver 304 sequentially supplies a gate pulse (or scan pulse), which is synchronized with the data voltage, to the gate lines G1-Gn to select the lines of the display panel 300 to which the data voltage is to be input, during the display driving period Td. The gate pulse swings between a gate high voltage VGH and a gate low voltage VGL. The gate pulse is applied to gates of the pixel TFTs through the gate lines G1-Gn. The gate high voltage VGL is set to be higher than the threshold voltage of the pixel TFT, to turn on the pixel TFT. The gate low voltage VGL is lower than the threshold voltage of the pixel TFT. The gate driver 304 may apply an alternating signal to the data lines S1-Sm, the alternating signal having the same phase as the touch sensor driving signal Tdrv applied to the touch sensors during the touch driving period Tdrv.

The timing controller 306 receives timing signals, such as a vertical synchronization signal, a horizontal synchronization, a data enable signal, a main clock, and the like, which are input from a host system 308, to synchronize the operation timings of the data driver 302, the gate driver 304, and the touch sensor driver 310. A scan timing control signal includes a gate start pulse GSP, a gate shift clock, a gate output enable signal GOE, and the like. A data timing control signal includes a source sampling clock SSC, a polarity control signal POL, a source output enable signal SOE, and the like.

The timing controller 306 transmits an input image data RGB to the data driver 302 from the host system 308. The timing controller 306 converts the RGB data into, for example, a RGBW data using a known white gain calculation algorithm to transmit the RGBW data to the data driver 302.

The host system 308 may be implemented as any one of a television system, a set-top box, a navigation system, a DVD player, a Blu-ray disk player, a personal computer (PC), a home theater system, and a phone system. The host system 308 includes a system on chip (SoC) with a built-in scaler, and thus converts the digital video data of the input image into a format suitable for the resolution of the display panel 300. The host system 308 transmits the timing signals together with the digital video data RGB or RGBW of the input image to the timing controller 306. In addition, the host system 308 runs an application program connected with coordinate information (XY) of the touch input, which is input from the touch sensor driver 310.

The timing controller 306 or the host system 308 may generate a synchronization signal Tsync for synchronizing the display drivers 302, 304, and 306 and the touch sensor driver 310.

The touch sensor driver 310 generates the touch driving signal Tdrv during the touch sensor driving period Tt. The touch driving signal Tdrv is supplied to the sensor electrodes 13 or C1-C4 through the sensor wires M3. The touch sensor driver 310 can sense the touch position and touch area by measuring a change in capacitance of the touch sensor Cs. The touch sensor driver 310 calculates the coordinate information (XY) of the touch input to transmit the calculated coordinate information to the host system 308.

A data driving circuit 12 and the touch sensor driver 310 may be integrated in one integrated circuit (IC).

Figure 15:
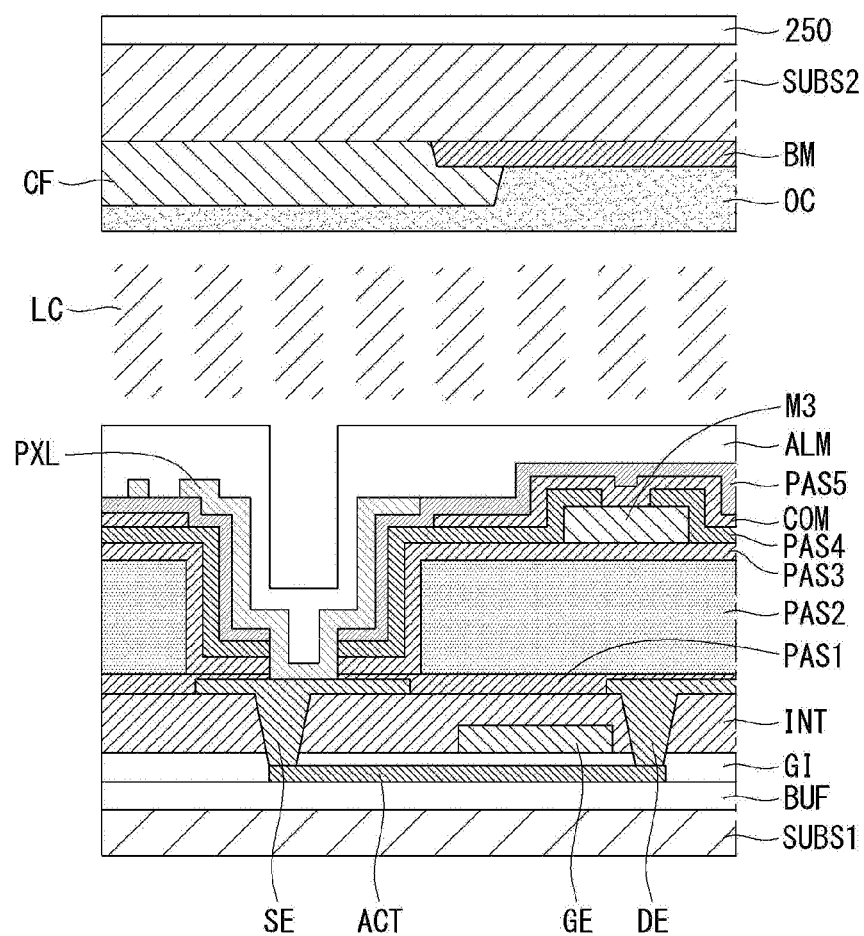
FIG. 15 is a cross-sectional view of a display panel according to an embodiment of the present invention.

FIG. 15 is a cross-sectional view illustrating a cross-sectional structure of the display panel 300.

Referring to FIG. 15, a lower board of the display panel 300 includes a TFT array on a lower substrate SUBS1. An upper board of the display panel 300 includes a color filter array on an upper substrate SUBS2. A liquid crystal layer LC is formed between the upper board and the lower board of the display panel 300.

A buffer insulating film BUF, a semiconductor pattern ACT, and a gate insulating film GI are formed on the lower substrate SUBS1. A first metal pattern is formed on the gate insulating film GI. The gate metal pattern includes gates GE of TFTs, and gate lines G1-Gn connected to the gates GE. The interlayer insulating film INT covers a second metal pattern. A source-drain metal pattern is formed on the interlayer insulating film INT. The second metal pattern includes data lines S1-Sm, and sources SE and drains DE of TFTs. The drains DE are connected to the data lines S1-Sm. The source SE and drain DE of the TFT are contacted with the semiconductor pattern ACT of the TFT through a contact hole passing through the interlayer insulating film INT.

A first passivation film PAS1 covers a second metal pattern. A second protective film PAS2 is formed on the first protective film PAS1. A contact hole is formed in the second protective film PAS2 to expose the source SE of the TFT. A third protective film PAS2 is formed on the second protective film PAS2, and a third metal pattern is formed on the third protective film PAS3. The third metal pattern includes a sensor wire M3. A fourth protective film PAS4 is formed on the third protective film PAS3 to cover the third metal pattern. A fourth metal pattern is formed on the fourth protective film PAS4. The fourth metal pattern includes a sensor electrode 13 (COM) formed of a transparent electrode material, such as indium tin oxide (ITO). A fifth protective film PAS5 is formed on the fourth protective film PAS4 to cover the fourth metal pattern. The first, third, fourth, and fifth protective films PAS1, PAS3, PAS4, or PAS5 may be formed of an inorganic insulating material, such as SiOx or SiNx. The second protective film PAS2 may be formed of an organic insulating material, such as photoacryl.

The, first, third, fourth, and fifth protective films PAS1, PAS3, PAS4, PAS5 are patterned to include a contact hole exposing the source SE of the TFT. A fifth metal pattern is formed on the fifth protective film PAS5. The fifth metal pattern includes a pixel electrode 12 (PXL) formed of a transparent electrode material, such as ITO. An alignment film ALM is formed on the fifth protective film PAS5 to cover the fifth metal pattern.

A black matrix BM and color filters CF are formed on the upper substrate SUBS2, and a planarization film OC is formed thereon. The planarization film OC may be formed of an organic insulating material. Although not shown, spacers are formed between the upper substrate and the lower substrate to hold a cell gap of the liquid crystal layer.

An antistatic film 250 according to an embodiment of the present invention is formed on the upper substrate SUBS2. The antistatic film 250 exhibits an excellent electrical conductivity, and also has excellent mechanical strength and transmittance, and thus can be used as an antistatic coating film of a touch screen panel and a display device. A method for forming the antistatic film 250 is not particularly limited, but the antistatic film 250 may be formed by coating a conductive coating liquid composition according to an embodiment of the present invention on a substrate, followed by a curing process. A method for coating is not particularly limited, but a known method, such as slit coating, knife coating, spin coating, casting, micro-gravure coating, gravure coating, bar coating, roll coating, wire bar coating, dip coating, spray coating, screen printing, gravure printing, flexo printing, offset printing, inkjet coating, dispenser printing, nozzle coating, or capillary coating, may be employed. After the coating process, the coating film is cured by a drying process at a predetermined temperature, thereby forming the antistatic film 250.

Hereinafter, experimental examples will be provided to illustrate embodiments of the present invention, but the present invention is not limited thereto.

Second Experimental Example

Hereinafter, disclosed is an experimental example in which an antistatic film is formed using a carbon nanotube dispersion liquid composition and a conductive coating liquid composition containing the same according to an embodiment of the present invention.

Experiment 1: Measurement on Characteristics of a Conductive Coating Liquid Composition and a Coating Film (Antistatic Film) Manufactured Therefrom Example 1

<Preparation of Carbon Nanotube Dispersion Liquid>

Carbon nanotubes (SA100, Nano Solution Inc.) synthesized by an arc discharge method were thermally treated for 100 minutes under a rotation speed of 5-20 rpm, a temperature of 420° C., and an oxidative gas supply rate of 250 cc/min, using a rotary kiln reactor with an inclination angle of 3°, to obtain carbon nanotube A having an impurity content of 15%, which were then used.

After that, a carbon nanotube dispersion liquid was prepared by mixing 0.15 parts by weight of carbon nanotube A, 0.24 parts by weight of an aqueous solution of a polyacrylic acid resin (solid 25%/polyacrylic acid resin Mw=(250,000)), 0.23 parts by weight of an acrylic block copolymer (product name: DISPERBYK2001, acid value: 19 mgKOH/g, amine value: 29 mgKOH/g), and 99.61 parts by weight of n-propanol, and dispersing the mixture using a disperser with a nozzle diameter of 100 μm at a pressure of 1500 bar.

<Preparation of Silane Sol>

21.7 parts by weight of normal propanol and 62.6 parts by weight of TEOS were fed into a reactor with a flux tube, and stirred at 300 rpm under room temperature (25° C.) using a stirrer for 30 minutes. Then, 15.2 parts by weight of water was added thereto, followed by stirring at 500 rpm, and then 0.5 parts by weight of a 3% aqueous solution of hydrochloric acid was slowly dropped.

<Conductive Coating Liquid Composition>

A coating liquid was prepared by conducting a procedure, five times, in which 33 parts by weight of a binder, 0.95 parts by weight of BYK2001, and 0.05 parts by weight of BYK333 as a surface slip agent were added to 66 parts by weight of the prepared carbon nanotube dispersion liquid and then the mixture was allowed to pass through a 100 μm nozzle under a pressure of 1500 bar using a high-pressure disperser. Here, a cooling apparatus was used to reduce or prevent the rise of the liquid temperature.

Example 2 (when the Type of Dispersion Medium is Different)

A conductive coating liquid composition was manufactured by the same method as in example 1 except that ethanol was used as a dispersion medium at the time of preparing a carbon nanotube dispersion liquid.

Example 3 (when the Type of Dispersion Medium is Different)

A conductive coating liquid composition was manufactured by the same method as in example 1 except that butanol was used as a dispersion medium at the time of preparing a carbon nanotube dispersion liquid.

Example 4 (when the Type of Dispersion Medium is Different)

A conductive coating liquid composition was manufactured by the same method as in example 1 except that pentanol was used as a dispersion medium at the time of preparing a carbon nanotube dispersion liquid.

Example 5 (when the Weight Average Molecular Weight of PAA is Different)

A conductive coating liquid composition was manufactured by the same method as in example 1 except that a polyacrylic acid resin having a weight average molecular weight of 1,250,000 was used at the time of preparing a carbon nanotube dispersion liquid.

Example 6 (when BYK 2155 is Used)

A conductive coating liquid composition was manufactured by the same method as in example 1 except that DISPERBYK 2155 was used instead of DISPERBYK 2001 at the time of preparing a carbon nanotube dispersion liquid.

Example 7 (when the Jetting Pressure is Different)

A conductive coating liquid composition was manufactured by the same method as in example 1 except that jetting was conducted at a pressure of 1000 bar at the time of preparing a carbon nanotube dispersion liquid.

Example 8 (when the Jetting Pressure is Different)

A conductive coating liquid composition was manufactured by the same method as in example 1 except that jetting was conducted at a pressure of 1800 bar at the time of preparing a carbon nanotube dispersion liquid.

Example 9 (when the Diameter of the Jet Nozzle is Different)

A conductive coating liquid composition was manufactured by the same method as in example 1 except that jetting was conducted using a nozzle with a diameter of 500 μm at the time of preparing a carbon nanotube dispersion liquid.

Example 10 (when the Diameter of the Jet Nozzle is Different)

A conductive coating liquid composition was manufactured by the same method as in example 1 except that jetting was conducted using a nozzle with a diameter of 300 μm at the time of preparing a carbon nanotube dispersion liquid.

Example 11

A coating liquid was prepared by conducting a procedure, five times, in which 14 parts by weight of a binder, 0.95 parts by weight of BYK2001, 5 parts by weight of ethylene glycol, and 0.05 parts by weight of BYK333 as a surface slip agent were added to 80 parts by weight of the prepared carbon nanotube dispersion liquid and then the mixture was allowed to pass through a 100 μm nozzle under a pressure of 1500 bar using a high-pressure disperser. Here, a cooling apparatus was used to reduce or prevent the rise of the liquid temperature.

Comparative Example 1 (when the Type of Dispersion Medium is Out of a Range According to an Embodiment of Present Invention)

A conductive coating liquid composition was manufactured by the same method as in example 1 except that isopropanol was used as a dispersion medium at the time of preparing a carbon nanotube dispersion liquid.

Comparative Example 2 (when Sodium Dodecyl Sulfonate was Used as Dispersion Medium, Instead of PAA)

A conductive coating liquid composition was manufactured by the same method as in example 1 except that an aqueous solution of sodium dodecyl sulfonate was used instead of the aqueous solution of polyacrylic acid at the time of preparing a carbon nanotube dispersion liquid.

Comparative Example 3 (when Isopropanol is Used and the Jet Pressure is Out of a Range According to an Embodiment of the Present Invention)

A conductive coating liquid composition was manufactured by the same method as in example 1 except that jetting was conducted at a pressure of 900 bar at the time of preparing a carbon nanotube dispersion liquid.

Comparative Example 4 (when Isopropanol is Used and the Jet Pressure is Out of a Range According to an Embodiment of Present Invention)

A conductive coating liquid composition was manufactured by the same method as in example 1 except that jetting was conducted at a pressure of 2000 bar at the time of preparing a carbon nanotube dispersion liquid.

Test Method (1) Evaluation on Dispersibility

In order to evaluate the carbon nanotube dispersion liquid compositions manufactured according to the examples and comparative examples, the Zeta potential was measured, and evaluation was conducted on the basis of the following evaluation standard.

<Evaluation Standard>

◯: Absolute value of more than 25 mV

Δ: Absolute value in the range of 10 to 25 mV

X: Absolute value of less than 10 mV (2) Evaluation on Dispersion Stability

It was evaluated whether or not the carbon nanotube dispersion liquid compositions manufactured according to the examples and comparative examples aggregate in vials at room temperature for 30 days, on the basis of the following evaluation standard.

<Evaluation Standard>

◯: Aggregated after 14 days

Δ: Aggregated after 7 days

X: Aggregated within 2 days (3) Evaluation on Coatability

Conductive coating films were formed by coating the conductive coating liquid compositions according to the examples and comparative examples on glass substrates using a spin coater at 400 rpm for 15 seconds, conducting drying using a hot plate at 140° C. for 10 minutes, and conducting further drying using a hot-air dryer for 30 minutes. The uniformity of the formed coating films was observed by naked eyes, and evaluation was conducted on the basis of the following evaluation standard.

<Evaluation Standard>

◯: None pinholes

Δ: Less than 2 pinholes

X: 2 or more pinholes (4) Evaluation on Surface Specific Resistance

Conductive coating films were formed by coating the conductive coating liquid compositions according to the examples and comparative examples on glass substrates using a spin coater at 400 rpm for 15 seconds, conducting drying using a hot plate at 140° C. for 10 minutes, and conducting further drying using a hot-air dryer for 30 minutes. The surface specific resistance of the formed coating films was measured using a surface specific resistance meter. Here, the measurement of the specific surface resistance was conducted in a 4-point probe manner. The coating film was divided into three in a length direction, and the measurement was conducted at the middle portion thereof.

(5) Transmittance

Conductive coating films were formed by coating the conductive coating liquid compositions according to the examples and comparative examples on glass substrates using a spin coater at 400 rpm for 15 seconds, conducting drying using a hot plate at 140° C. for 10 minutes, and conducting further drying using a hot-air dryer for 30 minutes. The transmittance of the formed coating films was measured at 550 nm using a spectrophotometer, and evaluation was conducted compared with 90.5%, which is the transmittance of a glass substrate on which a coating film was not formed, on the basis of the following evaluation standard.

<Evaluation Standard>
◯: 89.5≤transmittance (%)
Δ: 87.55≤transmittance (%)<89.5
X: transmittance (%)<87.5

(6) Scratch Resistance

Conductive coating films were formed by coating the conductive coating liquid compositions according to the examples and comparative examples on glass substrates using a spin coater at 400 rpm for 15 seconds, conducting drying using a hot plate at 140° C. for 10 minutes, and conducting further drying using a hot-air dryer for 30 minutes. The surface hardness of the formed coating films was measured using a pencil hardness tester (221-D, Yoshimitsu).

<Evaluation Standard>
◯: 8~9 H
Δ: 6~7 H
X: ~5 H

The dispersibility, coatability, surface specific resistance, transmittance, and scratch resistance of the coating films formed according to the examples and comparative examples were measured, and tabulated in Table 3 below. In Table 3 below, ◯ is excellent, Δ is good, and X is bad.

and scratch resistance were excellent, and the surface specific resistance values thereof were $0^{8.0}$, $10^{8.0}$, and $10^{8.2}$ ($\Omega/\square$), respectively. As for Example 4, the dispersibility, coatability, transmittance, and scratch resistance were excellent, the dispersion stability was good, and the surface specific resistance value was $10^{8.7}$ ($\Omega/\square$).

As for Example 5 in which a polyacrylic acid resin having a weight average molecular weight of 1,250,000 was used and Example 6 in which DISPERBYK 2155 was used, at the time of preparing the carbon nanotube dispersion liquid, the dispersibility, dispersion stability, coatability, transmittance, and scratch resistance were excellent, and the surface specific resistance values thereof were $10^{8.2}$ and $10^{8.1}$ ($\Omega/\square$).

As for Example 7 in which jetting was conducted at a pressure of 1000 bar at the time of preparing the carbon nanotube dispersion liquid, the dispersibility, dispersion stability, coatability, transmittance, and scratch resistance were excellent, and the surface specific resistance value was $10^{8.1}$ ($\Omega/\square$). In addition, as for Example 8 in which jetting was conducted at a pressure of 1800 bar, the dispersibility, coatability, transmittance, and scratch resistance were excellent while the dispersion stability was good, and the surface specific resistance value was $10^{8.3}$ ($\Omega/\square$).

As for Examples 9 and 10 in which jetting was conducted using nozzles with diameters of 500 μm and 300 μm at the time of preparing the carbon nanotube dispersion liquid, the surface specific resistance values were $10^{8.1}$ and $10^{8.3}$ ($\Omega/\square$), respectively, and the dispersibility, coatability, transmittance, and scratch resistance were excellent while the dispersion stability was good.

As for example 11 in which 14 parts by weight of a binder, 0.95 parts by weight of BYK2001, and 5 parts by weight of ethylene glycol were added to 80 parts by weight of the carbon nanotube dispersion liquid, the surface specific resistance value was $10^{5.0}$ ($\Omega/\square$), and the dispersibility, dispersion stability, coatability, transmittance, and scratch resistance were excellent.

TABLE 3

| | Dispersion characteristics | | | Surface specific resistance ($\Omega/\square$) | Transmittance (%) | Scratch resistance |
|---|---|---|---|---|---|---|
| | Dispersibility | Dispersion stability | Coatability | | | |
| Example 1 | ◯ | ◯ | ◯ | $10^{8.0}$ | ◯ | ◯ |
| Example 2 | ◯ | ◯ | ◯ | $10^{8.0}$ | ◯ | ◯ |
| Example 3 | ◯ | ◯ | ◯ | $10^{8.2}$ | ◯ | ◯ |
| Example 4 | ◯ | Δ | ◯ | $10^{8.7}$ | ◯ | ◯ |
| Example 5 | ◯ | ◯ | ◯ | $10^{8.2}$ | ◯ | ◯ |
| Example 6 | ◯ | ◯ | ◯ | $10^{8.1}$ | ◯ | ◯ |
| Example 7 | ◯ | ◯ | ◯ | $10^{8.1}$ | ◯ | ◯ |
| Example 8 | ◯ | Δ | ◯ | $10^{8.3}$ | ◯ | ◯ |
| Example 9 | ◯ | Δ | ◯ | $10^{8.1}$ | ◯ | ◯ |
| Example 10 | ◯ | Δ | ◯ | $10^{8.3}$ | ◯ | ◯ |
| Example 11 | ◯ | ◯ | ◯ | $10^{5.0}$ | ◯ | ◯ |
| Comparative Example 1 | Δ | x | Δ | $10^{8.2}$ | ◯ | ◯ |
| Comparative Example 2 | x | x | x | $10^{9.4}$ | x | Δ |
| Comparative Example 3 | Δ | x | Δ | $10^{8.3}$ | ◯ | Δ |
| Comparative Example 4 | Δ | x | Δ | $10^{8.5}$ | ◯ | ◯ |

Referring to Table 3, as for Examples 1 to 3 in which propanol, ethanol, and butanol were used as a solvent at the time of preparing the carbon nanotube dispersion liquid, the dispersibility, dispersion stability, coatability, transmittance, On the other hand, as for Comparative Example 1 in which isopropanol was used as a dispersion medium at the time of the carbon nanotube dispersion liquid, the surface specific resistance value was $10^{8.2}$ ($\Omega/\square$), and the transmittance and scratch resistance were excellent, but the dispersibility and coatability were good, and the dispersion stability was bad.

As for Comparative Example 2 in which the aqueous solution of sodium dodecyl sulfonate was used instead of the aqueous solution of polyacrylic acid at the time of preparing the carbon nanotube dispersion liquid, the surface specific resistance value was $10^{9.4}$ ($\Omega/\square$), and the scratch resistance was good, but the dispersibility, dispersion stability, coatability, and transmittance were bad.

As for Comparative Examples 3 and 4 in which isopropanol was used and jetting was conducted at 900 bar and 2000 bar at the time of preparing the carbon nanotube dispersion liquid, the surface specific resistance values were, respectively, $10^{8.3}$ and $10^{8.5}$ ($\Omega/\square$), the transmittance was excellent, and the dispersibility and coatability were good, but the dispersion stability was bad. In addition, the scratch resistance was good for comparative example 3, and excellent for Comparative Example 4.

These results indicate that the coating films manufactured in accordance with the process of preparing the carbon nanotube dispersion liquid according to an embodiment of present invention had excellent dispersibility, dispersion stability, coatability, surface specific resistance, transmittance, and scratch resistance.

Experiment 2: Measurement on Characteristics of Coating Film (Antistatic Film) Depending on pH Values of Carbon Nanotube Dispersion Liquid and Binder A conductive coating liquid was prepared by conducting a procedure, five times, in which 32.95 parts by weight of a TEOS sol binder and 0.05 parts by weight of BYK333 as a surface slip agent are added to 67 parts by weight of the prepared carbon nanotube dispersion liquid in Example 1 as described above and then the mixture was allowed to pass through a 100 μm nozzle under a pressure of 1500 bar using a high-pressure disperser. Here, coating films were formed by using conductive coating liquids prepared by differentiating the pH of the carbon nanotube dispersion liquid to 1.60, 2.00, 2.30, 2.85, 3.50, and 4.50 in a state in which the pH of the binder was set to 2.0. The viscosities of the conductive coating liquid at the initial time and after 7 days were measured, and the resistances of the coating film at the initial time and after 7 days were measured, and the measurement results were tabulated in Table 2 below. In addition, coating films were formed by using conductive coating liquids prepared by differentiating the pH of the binder to 1.60, 2.00, 2.30, 2.85, 3.50, and 4.50 in a state in which the pH of the carbon nanotube dispersion liquid was set to 2.0. The viscosities of the conductive coating liquid at the initial time and after 7 days were measured, and the resistances of the coating film at the initial time and after 7 days were measured, and the measurement results were tabulated in Table 4 below.

TABLE 4

| | pH of carbon nanotube dispersion liquid | pH of binder | Resistance of coating film ($\Omega/\square$) | | | Viscosity of conductive coating liquid (cP) | | |
|---|---|---|---|---|---|---|---|---|
| | | | Initial | After 7 days | Variation | Initial | After 7 days | Variation |
| #1 | 1.60 | 2.00 | 8.0 | 6.9 | −1.1 | 3.48 | 5.20 | 1.72 |
| | 2.00 | 2.00 | 8.0 | 7.3 | −0.7 | 3.52 | 4.52 | 1.0 |
| | 2.30 | 2.00 | 8.1 | 7.3 | −0.8 | 3.53 | 4.73 | 1.2 |
| | 2.85 | 2.00 | 8.2 | 7 | −1.2 | 3.63 | 4.92 | 1.29 |
| | 3.50 | 2.00 | 8.1 | 7 | −1.1 | 3.75 | 5.03 | 1.28 |
| | 4.50 | 2.00 | 8.1 | 6.9 | −1.2 | 3.82 | 5.38 | 1.56 |
| #2 | 2.00 | 1.60 | 8.1 | 6.9 | −1.2 | 3.51 | 5.43 | 1.92 |
| | 2.00 | 2.00 | 8.0 | 7.3 | −0.7 | 3.52 | 4.52 | 1.0 |
| | 2.00 | 2.30 | 8.2 | 7.2 | −1.0 | 3.40 | 4.55 | 1.15 |
| | 2.00 | 2.80 | 8.2 | 7 | −1.2 | 3.55 | 5.02 | 1.47 |
| | 2.00 | 3.50 | 8.1 | 6.7 | −1.4 | 3.62 | 5.30 | 1.68 |
| | 2.00 | 4.50 | 8.0 | 6.5 | −1.5 | 3.71 | 5.47 | 1.76 |

Referring to Table 4, as the pH of the carbon nanotube dispersion liquid was closer to the pH of the binder when the pH of the binder was set to 2.00, the variation in the resistance of the coating film was reduced from −1.2 to −0.7 ($\Omega/\square$) and the variation in the viscosity of the conductive coating liquid was reduced from 1.56 to 1.0 cP. In addition, as the pH of the binder was closer to the pH of the carbon nanotube dispersion liquid when the pH of the carbon nanotube dispersion liquid was set to 2.00, the variation in the resistance of the coating film was reduced from −1.5 to −0.7 ($\Omega/\square$) and the variation in the viscosity of the conductive coating liquid was reduced from 1.76 to 1.0 cP.

These results indicate that, as the pH values of the carbon nanotube dispersion liquid and the binder were closer to each other, the variations in the resistance of the coating film and the viscosity of the conductive coating liquid were smaller, and when the pH values of the carbon nanotube dispersion liquid and the binder were 2.00, the variations in the resistance of the coating film and the viscosity of the conductive coating liquid were the smallest.

As described above, a carbon nanotube dispersion liquid composition according to an embodiment of the present invention can effectively disperse carbon nanotubes by using the polyacrylic acid resin as a dispersing agent, and can have an excellent dispersion stability by using an alcohol with a particular structure.

In a method for manufacturing a carbon nanotube dispersion liquid composition according to an embodiment of the present invention, a high-pressure dispersion was conducted at a particular pressure range, thereby increasing the dispersion activity of the polyacrylic acid resin, thus improving the dispersibility of the carbon nanotubes and improving the stability after dispersion of the carbon nanotubes.

A conductive coating liquid composition containing a carbon nanotube dispersion liquid composition according to an embodiment of the present invention may form a uniform coating film, and the formed coating film may have excellent chemical stability and electrical conductivity.

An antistatic film formed of a conductive coating liquid composition according to an embodiment of the present invention exhibits an excellent electrical conductivity, and also has excellent mechanical strength and transmittance, and thus can be used as a coating film for reducing or preventing static electricity of a touch screen panel and an image display device.

An antistatic film and a display device comprising the same according to an embodiment of the present invention may discharge a static electricity generated during the manufacturing processes to the outside to suppress defects, reduce or prevent deterioration in touch sensitivity, with improved sheet resistance uniformity, heat resistance, and reliability, and reduce the manufacturing costs.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

It will be apparent to those skilled in the art that various modifications and variation can be made in the present invention without departing from the concepts and scope of the invention. Thus, it is intended that the present

What is claimed is:

1. A carbon nanotube dispersion liquid composition, comprising:

0.05 to 20 wt % of carbon nanotubes;
   0.02 to 40 wt % of a polyacrylic acid resin; and
   50 to 99.93 wt % of $C_2$-$C_5$ straight-chain alkanol based on a total weight of the carbon nanotube dispersion liquid composition.

2. The carbon nanotube dispersion liquid composition of claim 1, wherein the polyacrylic acid resin has a weight average molecular weight of 2,000 to 3,000,000.

3. The carbon nanotube dispersion liquid composition of claim 2, wherein the polyacrylic acid resin has a weight average molecular weight of 8,000 to 12,000.

4. The carbon nanotube dispersion liquid composition of claim 1, wherein the alkanol is at least one of ethanol, n-propanol, n-butanol, and n-pentanol.

5. The carbon nanotube dispersion liquid composition of claim 1, further comprising an acrylic block copolymer dispersant.

6. The carbon nanotube dispersion liquid composition of claim 5, wherein the acrylic block copolymer dispersant is substituted with at least one of an amine group and a carboxyl group.

7. The carbon nanotube dispersion liquid composition of claim 5, wherein the acrylic block copolymer dispersant is contained in 0.1 to 2 wt % based on the total weight of the carbon nanotube dispersion liquid composition.

8. The carbon nanotube dispersion liquid composition of claim 1, wherein pH of the carbon nanotube dispersion liquid composition is 1.7 to 3.5.

* * * * *